United States Patent
Iwai

(10) Patent No.: US 9,800,118 B2
(45) Date of Patent: Oct. 24, 2017

(54) SELF-COOLED MOTOR

(71) Applicant: Nidec Corporation, Kyoto (JP)

(72) Inventor: Yusuke Iwai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 374 days.

(21) Appl. No.: 14/585,598

(22) Filed: Dec. 30, 2014

(65) Prior Publication Data
US 2015/0295471 A1 Oct. 15, 2015

(30) Foreign Application Priority Data
Apr. 11, 2014 (JP) ................... 2014-081938

(51) Int. Cl.
| | |
|---|---|
| *H02K 9/06* | (2006.01) |
| *H02K 1/27* | (2006.01) |
| *H02K 1/32* | (2006.01) |
| *H02K 9/14* | (2006.01) |
| *H02K 5/20* | (2006.01) |
| *H02K 7/14* | (2006.01) |

(52) U.S. Cl.
CPC ............. *H02K 9/06* (2013.01); *H02K 1/2786* (2013.01); *H02K 1/32* (2013.01); *H02K 9/14* (2013.01); *H02K 5/20* (2013.01); *H02K 7/14* (2013.01)

(58) Field of Classification Search
CPC .. H02K 9/06; H02K 1/2786; H02K 5/00–5/26
USPC ............................ 310/62, 63, 67 R, 89, 68 B
See application file for complete search history.

(56) References Cited

U.S. PATENT DOCUMENTS

| | | | |
|---|---|---|---|
| 6,130,491 A | 10/2000 | Mitamura et al. | |
| 2002/0047381 A1* | 4/2002 | Torii ..................... | H02K 15/14 310/89 |

(Continued)

FOREIGN PATENT DOCUMENTS

| | | |
|---|---|---|
| CN | 102594023 A | 7/2012 |
| DE | 3324076 A1 | 9/1984 |

(Continued)

OTHER PUBLICATIONS

Machine Translation, Mitamura et al., JP 07245925 A, Sep. 19, 1995.*

(Continued)

*Primary Examiner* — Thomas Truong
(74) *Attorney, Agent, or Firm* — Keating & Bennett, LLP

(57) ABSTRACT

A self-cooled motor includes a shaft; a rotor; a stator radially opposite the rotor; a housing supporting a bearing and the stator; and an impeller located axially below the rotor, and configured to rotate together with the shaft to generate an air current. The housing includes a base portion located axially above the rotor; two or more attachment portions radially outward of the rotor; and a cylindrical or substantially cylindrical cover portion configured to join the base portion and the attachment portions. A lower end of each attachment portion is located at an axial level lower than an axial level of the impeller. The base portion includes an air inlet. The cover portion includes an air outlet located between adjacent ones of the attachment portions, and configured to connect a space radially inside the housing and a space radially outside the housing with each other.

20 Claims, 19 Drawing Sheets

(56) References Cited

U.S. PATENT DOCUMENTS

| | | | |
|---|---|---|---|
| 2008/0084140 A1* | 4/2008 | Kim | F04D 29/668 310/67 R |
| 2012/0001505 A1* | 1/2012 | Henke | H02K 11/33 310/62 |
| 2014/0265739 A1 | 9/2014 | Iwai et al. | |

FOREIGN PATENT DOCUMENTS

| | | | |
|---|---|---|---|
| DE | 102 30 244 A1 | 1/2004 | |
| FR | 2947473 A3 * | 1/2011 | B23Q 11/128 |
| JP | 62-178777 U | 11/1987 | |
| JP | 07245925 A * | 9/1995 | |
| JP | 09-065632 A | 3/1997 | |
| JP | 2000-184644 A | 6/2000 | |
| JP | 2008-154369 A | 7/2008 | |

OTHER PUBLICATIONS

Machine Translation, Chen, FR 2947473 A3, Jan. 7, 2011.*
Machine Translation, Schiessler, DE 3324076, Sep. 27, 1984.*

* cited by examiner

SELF-COOLED MOTOR

BACKGROUND OF THE INVENTION

1. Field of the Invention

The present invention relates to a self-cooled motor, and more specifically to an improvement in a motor including a cooling blade configured to rotate together with a shaft.

2. Description of the Related Art

A common microwave oven includes a stirring fan arranged to stir air inside a heating chamber. The stirring fan is arranged inside the heating chamber, and is driven by a stirring motor arranged outside the heating chamber. The stirring motor is attached to an outside of a wall surface of the heating chamber with a shaft thereof projecting into the heating chamber. Thus, the stirring motor is in such an environment that heat is easily transferred from the heating chamber to the stirring motor, and therefore, an AC motor which is excellent in heat resisting property is used as the stirring motor.

The temperature of an interior of the heating chamber of the microwave oven typically becomes 300° C. or higher. On the other hand, a common magnet has a heat-resistant temperature of about 150° C., and decreases in coercive force when the temperature of the magnet exceeds about 130° C. Moreover, electronic components have heat-resistant temperatures still lower than the heat-resistant temperature of the magnet. Therefore, a brushless DC motor including a magnet and electronic components cannot be used as the stirring motor, and instead, an AC motor is typically used as the stirring motor.

With the AC motor, it is impossible to perform control of a rotation rate and a rotation direction more finely than with the brushless DC motor. Therefore, known microwave ovens have a problem in that it is impossible to finely control the rotation rate and the rotation direction of the stirring fan to prevent uneven cooking and an uneven temperature distribution. In other words, the known microwave ovens have a problem in that it is difficult to improve functionality by employing the stirring fan.

It is then conceivable to employ a brushless DC motor including a cooling mechanism as the stirring motor to improve the functionality of the microwave oven. A variety of techniques have been proposed with respect to the cooling mechanism of the brushless DC motor (see JP-A 2008-154369, JP-A 2000-184644, JP-UM-A 62-178777, and JP-A 2000-050575).

However, the cooling mechanism disclosed in each of the aforementioned patent documents is designed to discharge heat generated inside the brushless DC motor to an outside, and is therefore unable to sufficiently cool the brushless DC motor when the brushless DC motor is arranged in the vicinity of an external heat source, such as the heating chamber of the microwave oven.

For example, a motor described in each of the aforementioned patent documents includes a cooling mechanism which causes a blade arranged on a side opposite to a side where an attachment surface exists to rotate to send air into the motor from the side opposite to the side where the attachment surface exists. This cooling mechanism is unable to sufficiently reduce the likelihood that a high-temperature air in the vicinity of the attachment surface will flow into the motor. Moreover, because radiant heat from the attachment surface, which has a high temperature, is not taken into consideration, this cooling mechanism is unable to exhibit sufficient cooling performance.

SUMMARY OF THE INVENTION

In view of the above circumstances, preferred embodiments of the present invention provide a self-cooled motor which is capable of being used in a high temperature environment, and, in particular, provide a self-cooled motor which is capable of being attached to an attachment surface having a high temperature, such as a wall surface of a high temperature chamber of a microwave oven, and used.

A self-cooled motor according to a preferred embodiment of the present invention is configured to be attached to a wall surface of a high temperature chamber through two or more attachment portions, and includes a shaft extending into the high temperature chamber, the self-cooled motor including the shaft, the shaft being supported by a bearing so as to be rotatable about a rotation axis extending in a vertical direction; a rotor configured to rotate together with the shaft; a stator radially opposite the rotor; a housing configured to support the bearing and the stator; and an impeller located axially below the rotor, and configured to rotate together with the shaft to generate an air current traveling radially outward.

The housing includes a base portion located axially above the rotor; the two or more attachment portions, each attachment portion being located radially outward of the rotor; and a cylindrical or substantially cylindrical cover portion configured to join the base portion and the attachment portions to each other. A lower end of each attachment portion is located at an axial level lower than an axial level of the impeller. The base portion includes an air inlet. The cover portion includes an air outlet located between adjacent ones of the attachment portions, and configured to connect a space radially inside the housing and a space radially outside the housing with each other.

When the above-described structure is adopted, rotation of the shaft causes the impeller to rotate to generate the air current traveling radially outward, and air in a space between the wall surface of the high temperature chamber and the rotor holder is discharged through the air outlet. Accordingly, outside air is taken in through the air inlet defined in the base portion of the housing, and the outside air taken in travels in an axial direction inside the cover portion of the housing toward the wall surface of the high temperature chamber. Accordingly, a high-temperature air in the vicinity of the wall surface of the high temperature chamber is discharged radially along the wall surface of the high temperature chamber, and the outside air, which has a low temperature, is taken in through the base portion on a side opposite to a side where the wall surface of the high temperature chamber exists, such that a flow of air which passes axially downward inside the rotor holder is generated to cool an interior of the motor.

Preferred embodiments of the present invention provide a self-cooled motor which is capable of being used in a high temperature environment. In particular, preferred embodiments of the present invention are able to provide a self-cooled motor which is configured to be attached to an attachment surface having a high temperature, such as, for example, a wall surface of a high temperature chamber of a microwave oven, and used.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. For the sake of convenience in description, a direction parallel or substantially parallel to a rotation axis J of a motor is herein referred to as a vertical direction. However, this definition of the vertical direction should not be construed to restrict in any way the orientation of a motor according to any preferred embodiment of the present invention when in use. In addition, the direction parallel or substantially parallel to the rotation axis J of the motor is referred to simply by the term "axial direction", "axial", or "axially", radial directions centered on the rotation axis J are referred to simply by the term "radial direction", "radial", or "radially", and a circumferential direction about the rotation axis J is referred to simply by the term "circumferential direction", "circumferential", or "circumferentially".

First Preferred Embodiment

Figure 1:
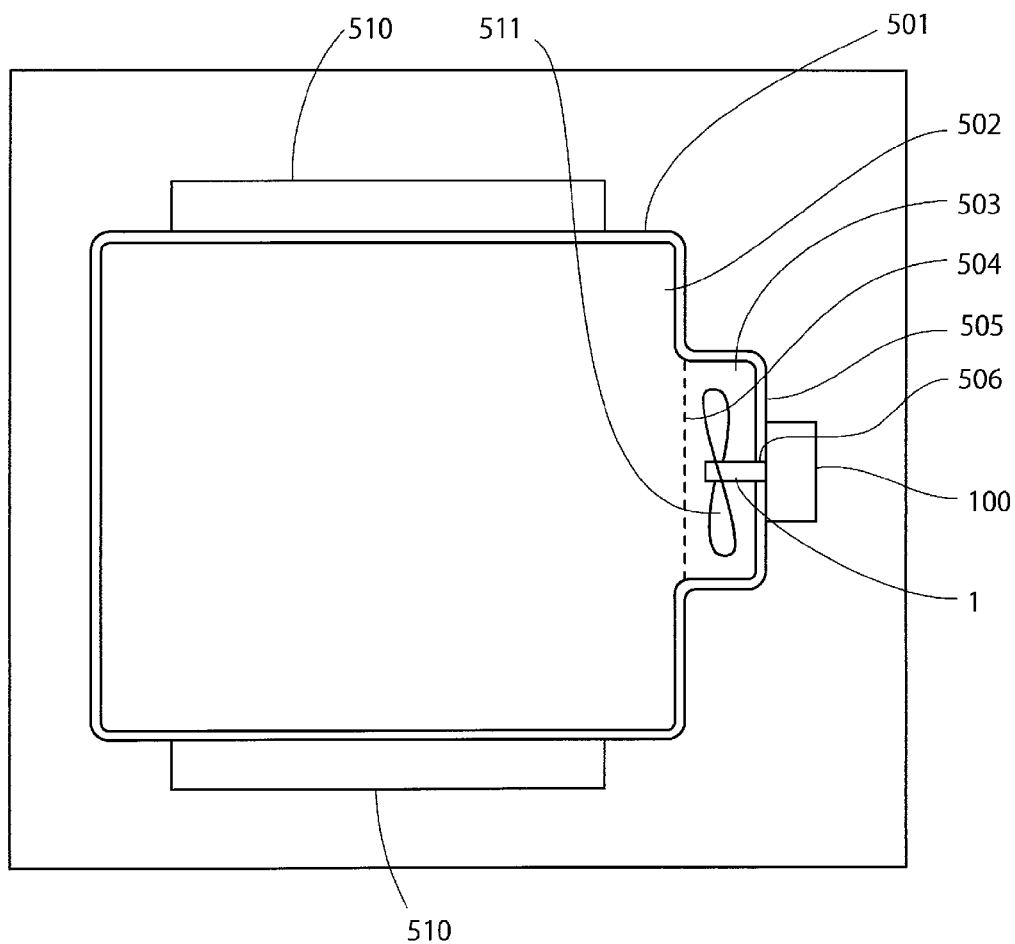
FIG. 1 is a diagram illustrating an exemplary structure of a microwave oven 500 including a motor 100 according to a first preferred embodiment of the present invention.

FIG. 1 is a diagram illustrating an exemplary structure of a microwave oven 500 including a motor 100 according to a first preferred embodiment of the present invention. The microwave oven 500 is a cooking apparatus including a high temperature chamber 501. The high temperature chamber 501 preferably includes a heating chamber 502 and a stirring chamber 503 divided by a wire net 504.

The heating chamber 502 is a space which accommodates, for example, food as an object to be heated. Heating devices 510 are preferably arranged above and below the heating chamber 502. Each heating device 510 is a device which heats the food inside the high temperature chamber 501. A heater or a microwave generating device, such as for example a magnetron, is preferably used as each heating device 510. The stirring chamber 503 is a space in which a stirring fan 511 is arranged. The stirring fan 511 is caused to rotate to stir air to change a temperature distribution inside the heating chamber 502. The stirring fan 511 is driven by the motor 100, which is attached to a side wall of the stirring chamber 503. The wire net 504 is provided to prevent an interference between the food inside the heating chamber 502 and the stirring fan 511, and for the safety of a user of the microwave oven 500. The air is able to freely pass through the wire net 504.

The motor 100 is a driving source of the stirring fan 511, and is preferably attached to an outer surface of a wall surface 505 of the high temperature chamber 501 with a shaft 1 of the motor 100 projecting into the high temperature chamber 501. The wall surface 505 of the high temperature chamber 501 will be hereinafter referred to as a "high temperature chamber wall surface" 505. More specifically, the motor 100 is arranged outside the high temperature chamber 501, the shaft 1 extends toward the high temperature chamber 501, passing through a through hole 506 defined in the high temperature chamber wall surface 505, and the stirring fan 511 is attached to a portion of the shaft 1 near a top thereof, the portion being located inside the stirring chamber 503.

Figure 2:
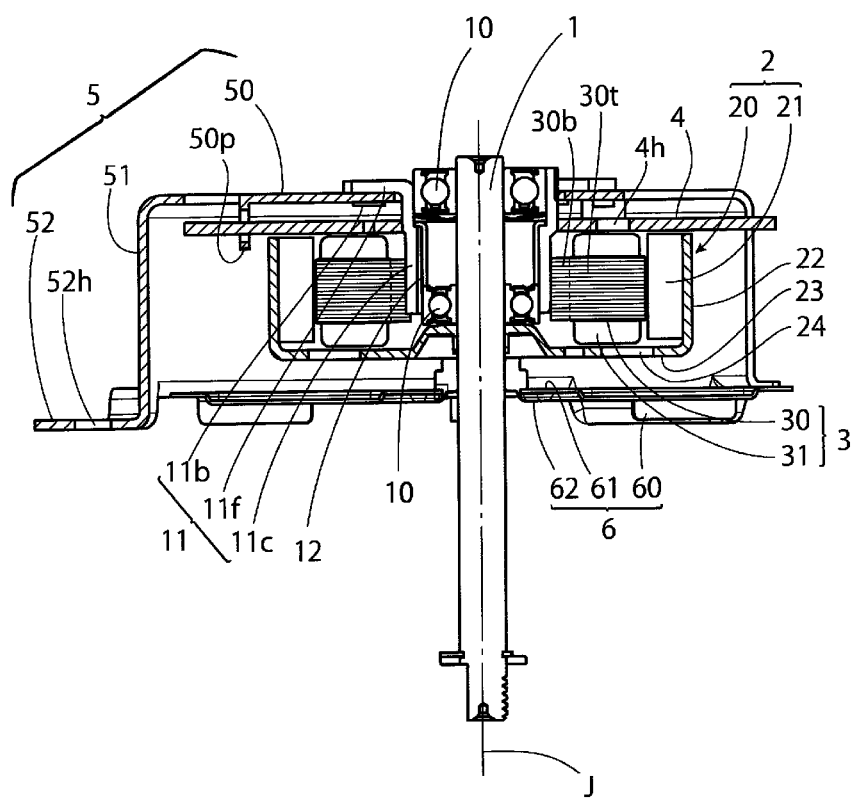
FIG. 2 is a cross-sectional view of the motor 100 according to the first preferred embodiment of the present invention.
Figure 3:
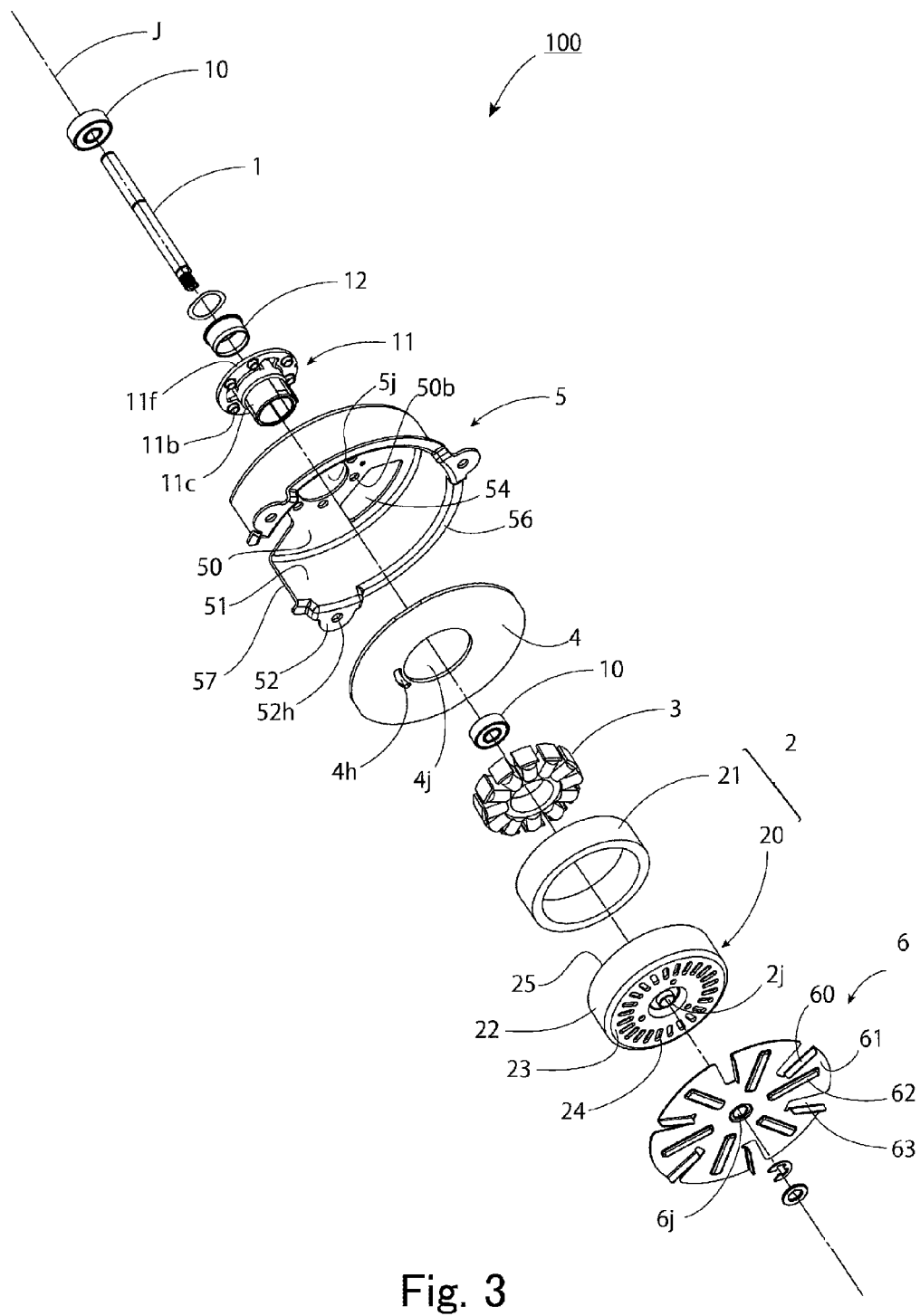
FIG. 3 is an exploded perspective view of the motor 100 illustrated in FIG. 2, illustrating components of the motor 100 separated from one another in an axial direction.

FIG. 2 is a cross-sectional view of the motor 100 according to the first preferred embodiment taken along a plane including a rotation axis J. FIG. 3 is an exploded perspective view of the motor 100, illustrating components of the motor 100 separated from one another in an axial direction.

The motor 100 is a self-cooled motor including an impeller 6 configured to rotate together with the shaft 1. The impeller 6 is located on a side where the high temperature chamber wall surface 505, which defines and serves as an attachment surface, exists. Once the shaft 1 starts rotating, the impeller 6 discharges a high-temperature air in the vicinity of the attachment surface radially outward. This contributes to reducing an increase in the temperature inside the motor 100. In addition, the impeller 6 is preferably arranged to block radiant heat from the attachment surface, and this contributes to reducing the increase in the temperature inside the motor 100. Further, the motor 100 includes a channel passing therethrough in the axial direction, and an air current passing therethrough is generated. Specifically, outside air is taken into the motor 100 from a side opposite to the side where the attachment surface exists, passes axially within the motor 100 toward the attachment surface, and is discharged radially outward in the vicinity of the attachment surface. As a result, air within the motor 100 is replaced with the outside air, which has a lower temperature, and an interior of the motor 100 is cooled.

The motor 100 is preferably an outer-rotor motor in which a rotor 2 is fixed to the shaft 1, and in which a stator 3 is radially inside and opposite the rotor 2 with a gap intervening therebetween. The motor 100 includes a stationary portion fixed to the high temperature chamber wall surface 505 of the microwave oven 500, and a rotating portion rotatably supported by the stationary portion. The rotating portion preferably includes the shaft 1, the rotor 2, and the impeller 6. Meanwhile, the stationary portion preferably includes the stator 3, a circuit board 4, a housing 5, two bearings 10, and a bearing holding portion 11. Hereinafter, each of these components will be described in detail.

The shaft 1 is a columnar or substantially columnar member extending in the axial direction (i.e., the vertical direction). The shaft 1 is configured to rotate about the rotation axis J while being supported by the two bearings 10. A lower end portion of the shaft 1 projects downward below the housing 5. This projecting lower end portion is configured to pass through the through hole 506 of the high temperature chamber wall surface 505. The stirring fan 511 is attached to the projecting lower end portion at a position closer to a top of the projecting lower end portion than to the high temperature chamber wall surface 505.

The rotor 2 is a member configured to rotate together with the shaft 1, and preferably includes a rotor holder 20 and a rotor magnet 21. The rotor holder 20 has a bottom and is cylindrical in shape, and includes a cylindrical portion 22 and a bottom plate portion 23. The rotor holder 20 has an upper opening 25 axially above. The cylindrical portion 22 is cylindrical or substantially cylindrical, and is located radially outside the stator 3. The bottom plate portion 23 is in the shape of a plate, and extends radially inward from a lower end of the cylindrical portion 22. The bottom plate portion 23 is located below the stator 3, and is fixed to the shaft 1. The rotor magnet 21 is preferably a permanent magnet, and is fixed to an inner circumferential surface of the cylindrical portion 22 of the rotor holder 20.

The bottom plate portion 23 of the rotor holder 20 preferably includes a through hole 2j for the shaft 1, and rotor vent holes 24 located radially outside the shaft 1. Each rotor vent hole 24 is, for example, a radially elongated opening. The rotor vent holes 24, numbering two or more, are located in a circumferential direction. According to the present preferred embodiment, the rotor vent holes 24 are arranged at regular intervals in the circumferential direction. Provision of these rotor vent holes 24 enables air to pass through the bottom plate portion 23 in the axial direction. This enables air inside the rotor holder 20 to be discharged toward the impeller 6.

In particular, when at least a portion of each rotor vent hole 24 is located radially inward of an inner circumferential surface of the rotor magnet 21, air flowing in the axial direction inside the rotor holder 20 is able to smoothly pass through the rotor vent hole 24. In addition, when at least a portion of each rotor vent hole 24 is located radially outward of an outer circumferential surface of a core back 30b of the stator 3, the air flowing in the axial direction inside the rotor holder 20 is able to smoothly pass through the rotor vent hole 24.

The stator 3 is an armature of the motor 100, preferably includes a stator core 30 and coils 31, and is radially inside the rotor 2. The stator 3 is annular or substantially annular, and an outer circumferential surface of the stator 3 is located radially opposite the rotor magnet 21 with a gap intervening therebetween.

The stator core 30 is preferably, for example, defined by laminated steel sheets, i.e., magnetic steel sheets, such as silicon steel sheets, placed one upon another in the axial direction. The stator core 30 includes the core back 30b, which is annular, and a plurality of teeth 30t arranged to project radially outward from the outer circumferential surface of the core back 30b. A winding is wound around each of the teeth 30t to define the coils 31. Once drive currents are supplied to the coils 31, radial magnetic flux is generated around each of the teeth 30t, each of which is a magnetic core. A circumferential torque is thus produced between the teeth 30t and the rotor magnet 21, so that the shaft 1 is caused to rotate about the rotation axis J.

The circuit board 4 is a board on which an electronic circuit (not shown) designed to supply the electric drive current to the coils 31 is mounted, and is a circular or substantially circular plate-shaped body. Electronic components, including a semiconductor device, are mounted on the circuit board 4. In addition, a magnetic sensor and a connector may preferably be mounted on the circuit board 4. The circuit board 4 preferably has an outside diameter greater than the outside diameter of the rotor holder 20, is located axially above the rotor 2, and is arranged opposite to the upper opening 25 of the rotor holder 20.

The circuit board 4 preferably includes a through hole 4j for the shaft 1, and a board vent hole 4h located radially outside the shaft 1. The board vent hole 4h is, for example, a circumferentially elongated opening. Provision of the board vent hole 4h as described above enables air to pass through the circuit board 4 in the axial direction.

The board vent hole 4h is preferably located radially inward of the cylindrical portion 22 of the rotor holder 20, and is arranged opposite to the upper opening 25 of the rotor 2. Accordingly, good ventilation is secured above the rotor 2. That is, when at least a portion of the board vent hole 4h overlaps with the upper opening 25 of the rotor 2 when viewed in the axial direction, air is able to smoothly pass in the axial direction between an inside of the rotor 2 and a space above the circuit board 4.

Moreover, only a slight gap is defined between the circuit board 4 and an upper end of the cylindrical portion 22 of the rotor holder 20, and only a limited amount of air is permitted to pass radially through this gap. For example, the circuit board 4 is arranged opposite to the upper end of the cylindrical portion 22 of the rotor holder 20 while being spaced therefrom by a distance smaller than the radial thickness of the rotor magnet 21. The gap between the circuit board 4 and the upper end of the cylindrical portion 22 of the rotor holder 20 preferably has a very small width to limit a radial flow of air through the gap and to permit an axial flow of air through the board vent hole 4h in preference to the radial flow of air through the gap.

Each bearing 10 is a member configured to rotatably support the shaft 1. A ball bearing, for example, is preferably used as each bearing 10. Each of the two bearings 10 is press fitted and fixed to the shaft 1, and is loose fitted to the bearing holding portion 11. These bearings 10 are accommodated inside the bearing holding portion 11 with a spacer 12, which is fixed inside the bearing holding portion 11, held therebetween.

The bearing holding portion 11 is preferably a bracket which accommodates the bearings 10, and is obtained by subjecting a metal sheet, such as, for example, a galvanized steel sheet, to press working. The bearing holding portion 11 includes a cylindrical portion 11c press fitted and fixed to an inner circumferential surface of the stator 3, and a flange portion 11f extending radially outward from an upper end of the cylindrical portion 11c. The spacer 12, which is cylindrical or substantially cylindrical, is accommodated inside the cylindrical portion 11c. The two bearings 10 are supported by the bearing holding portion 11 as a result of the spacer 12 being press fitted inside the bearing holding portion 11. The flange portion 11f is arranged above a base portion 50 of the housing 5. A lower surface of the flange portion 11f includes boss portions 11b each of which extends axially downward, and each boss portion 11b is located in a through hole 50b defined in the base portion 50 of the housing 5. The flange portion 11f is accordingly supported so as to be incapable of turning relative to the housing 5.

The housing 5 preferably includes the base portion 50, which is located axially above the circuit board 4, a cover portion 51 located radially outside the rotor 2, and attachment portions 52 each of which is attached to the high temperature chamber wall surface 505, which is preferably located axially below the impeller 6. The housing 5 is in or substantially in the shape of a covered cylinder with a downward opening, and is easily produced by subjecting a metal sheet, such as, for example, an aluminum sheet, to press working, for example.

The base portion 50 is in or substantially in the shape of a circular plate, and extends radially inward from an upper end of the cover portion 51. The base portion 50 is configured to support the stator 3 and the two bearings 10 through the bearing holding portion 11. The base portion 50 preferably includes supporting projections 50p each of which projects axially downward. Each supporting projection 50p is configured to support the circuit board 4. An upper surface of the circuit board 4 is arranged opposite to a lower surface of the base portion 50 with a gap intervening therebetween. Each supporting projection 50p is preferably defined by, for example, subjecting the base portion 50 to a lancing process. In addition, the base portion 50 includes a through hole 5j for the bearing holding portion 11, and air inlets 54 located radially outside the bearing holding portion 11. Provision of the air inlets 54 in the base portion 50 enables the outside air to enter into the housing 5.

The cover portion 51 is a cylindrical or substantially cylindrical portion located radially outward of both the rotor 2 and the circuit board 4. An inner circumferential surface of the cover portion 51 is arranged opposite to an outer circumferential surface of the cylindrical portion 22 of the rotor holder 20 with a gap intervening therebetween. Similarly, the inner circumferential surface of the cover portion 51 is arranged opposite to an outer circumferential surface of the circuit board 4 with a gap intervening therebetween. The upper end of the cover portion 51 is joined to the base portion 50. In addition, the attachment portions 52, which number two or more, are arranged at a lower end of the cover portion 51. That is, the cover portion 51 is configured to join each of the two or more attachment portions 52 to the base portion 50. Moreover, two or more main air outlets 55 are preferably located in the circumferential direction below the cover portion 51. Furthermore, the cover portion 51 includes a secondary air outlet 57 defined by an opening passing therethrough in a radial direction at one circumferential position. Note that, although the base portion 50 and each attachment portion 52 are joined to each other through the cylindrical or substantially cylindrical cover portion 51 according to the present preferred embodiment, the cover portion 51 may be in any shape other than the cylindrical shape. Also note that the housing 5 may not necessarily include the cover portion 51, and that each attachment portion 51 may alternatively be extending axially downward from an outer periphery portion of the base portion 50.

Each attachment portion 52 is a member fixed to the high temperature chamber wall surface 505, which defines and serves as the attachment surface, and is a plate-shaped portion extending radially outward from the lower end of the cover portion 51. For example, the two or more attachment portions 52 are arranged at regular intervals in the circumferential direction. Each attachment portion 52 includes a hole 52h defined therein, and a fastener, such as a screw, may be used to fix the attachment portion 52 to the high temperature chamber wall surface 505. That is, the motor 100 is attached to the high temperature chamber wall surface 505 with a lower surface of each attachment portion 52 being in contact with the outer surface of the high temperature chamber wall surface 505.

The impeller 6 preferably includes a rotating plate 61 and two or more blades 60 arranged thereon, is located axially below the rotor 2, and preferably has an outside diameter smaller than the inside diameter of the cover portion 51 of the housing 5. The impeller 6 is arranged at an axial level higher than an axial level of a lower end of each attachment portion 52. The impeller 6 is configured to rotate together with the shaft 1 to generate an air current traveling radially outward between the rotor 2 and the high temperature chamber wall surface 505. The impeller 6 is easily produced by subjecting a metal sheet to a stamping process or the like, for example.

The rotating plate 61 is preferably in or substantially in the shape of a circular plate, and is fixed to the shaft 1. The two or more blades 60 are arranged on a lower surface of the rotating plate 61, and the blades 60 are caused to rotate together with the shaft 1. In addition, the rotating plate 61 preferably has an outside diameter greater than the outside diameter of the rotor holder 20, and is located axially opposite the bottom plate portion 23 of the rotor holder 20 with a gap intervening therebetween. Accordingly, the rotating plate 61 is able to block the radiant heat from the high temperature chamber wall surface 505 to reduce an increase in the temperature of each of the rotor 2 and the circuit board 4. In addition, the rotating plate 61 includes a through hole 6j for the shaft 1, and openings 63 permitting ventilation located radially outside the shaft 1. These openings 63 enable air to pass through the rotating plate 61 in the axial direction.

Each blade 60 is preferably a rectangular or substantially rectangular plate-shaped body projecting axially downward from the rotating plate 61, and is defined by, for example, subjecting the rotating plate 61 to a lancing process. Holes defined in the rotating plate 61 as a result of this process preferably are used as the openings 63. The two or more blades 60 are arranged at regular or substantially regular intervals in the circumferential direction on the rotating plate of the impeller 6. Each blade 60 is a plate-shaped body located in parallel or substantially in parallel with the rotation axis J, and extends in a radial direction. Therefore, once the shaft 1 starts rotating, the blades 60 are caused to rotate about the rotation axis J to generate the air current traveling radially outward through a centrifugal force. Moreover, this air current always flows radially outward regardless of a rotation direction of the shaft 1. Further, generation of the air current traveling radially outward produces a negative pressure radially inside each blade 60.

The rotating plate 61 further includes two or more ribs 62. Each rib 62 is a projection portion defined by bending a portion of the rotating plate 61 to increase the strength of the rotating plate 61. Each rib 62 is defined by subjecting the rotating plate 61 to press working, for example. The two or more ribs 62 are arranged at regular intervals in the circumferential direction in the rotating plate 61. In addition, each rib 62 is arranged between adjacent ones of the blades 60, projects in the same direction as a direction in which each blade 60 projects from the rotating plate 61, and is in an elongated shape extending in a radial direction. Accordingly, the ribs 62 promote the generation of the air current traveling radially outward caused by the blades 60.

Figure 4:
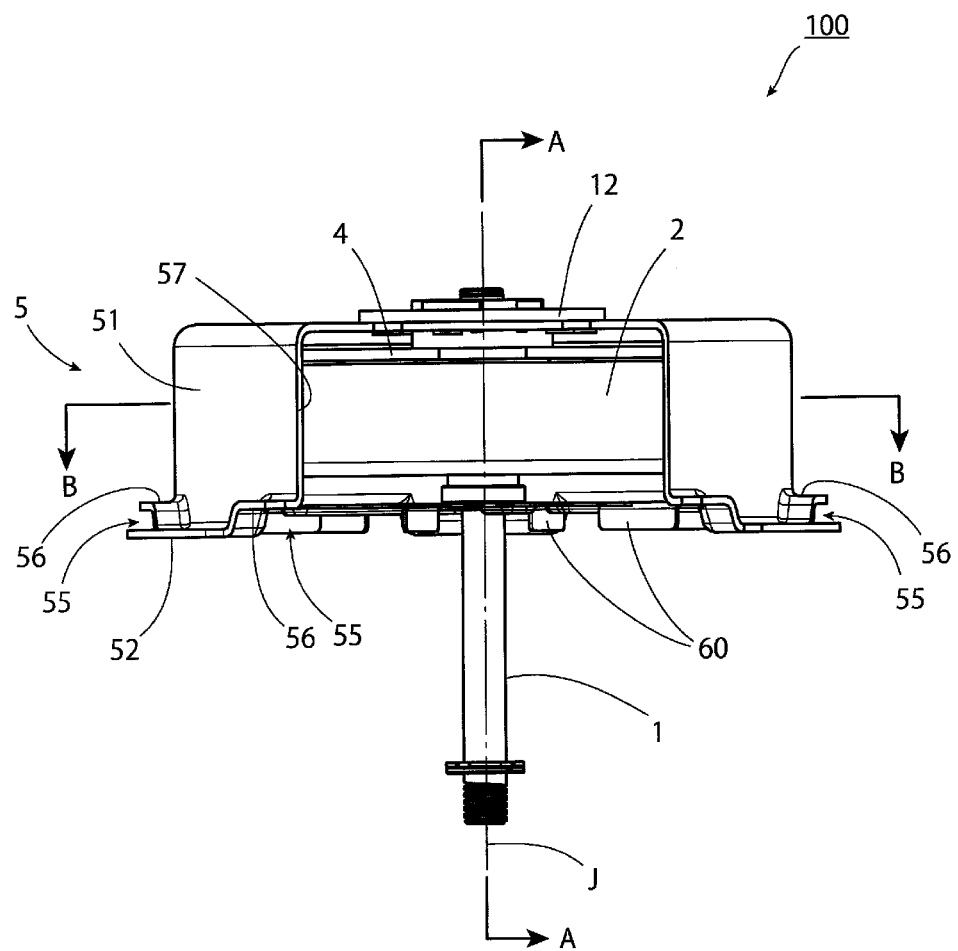
FIG. 4 is a front view of the motor 100 illustrated in FIG. 2.
Figure 5:
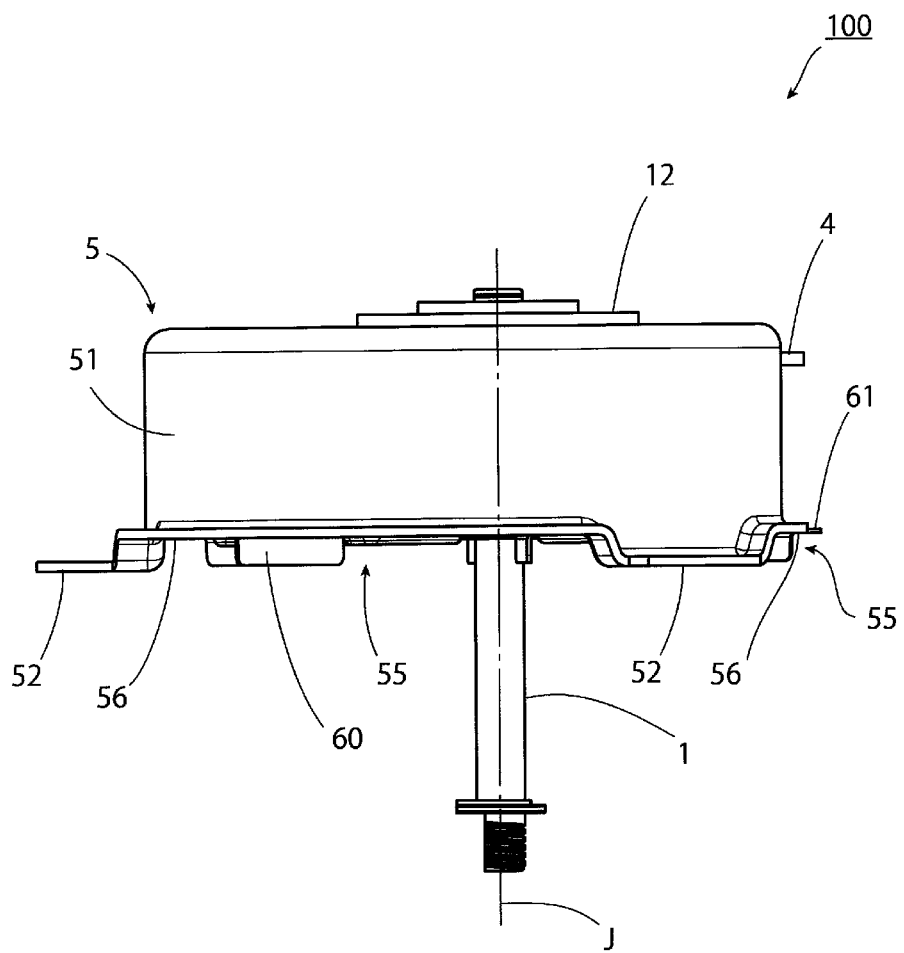
FIG. 5 is a left side view of the motor 100 illustrated in FIG. 2.
Figure 6:
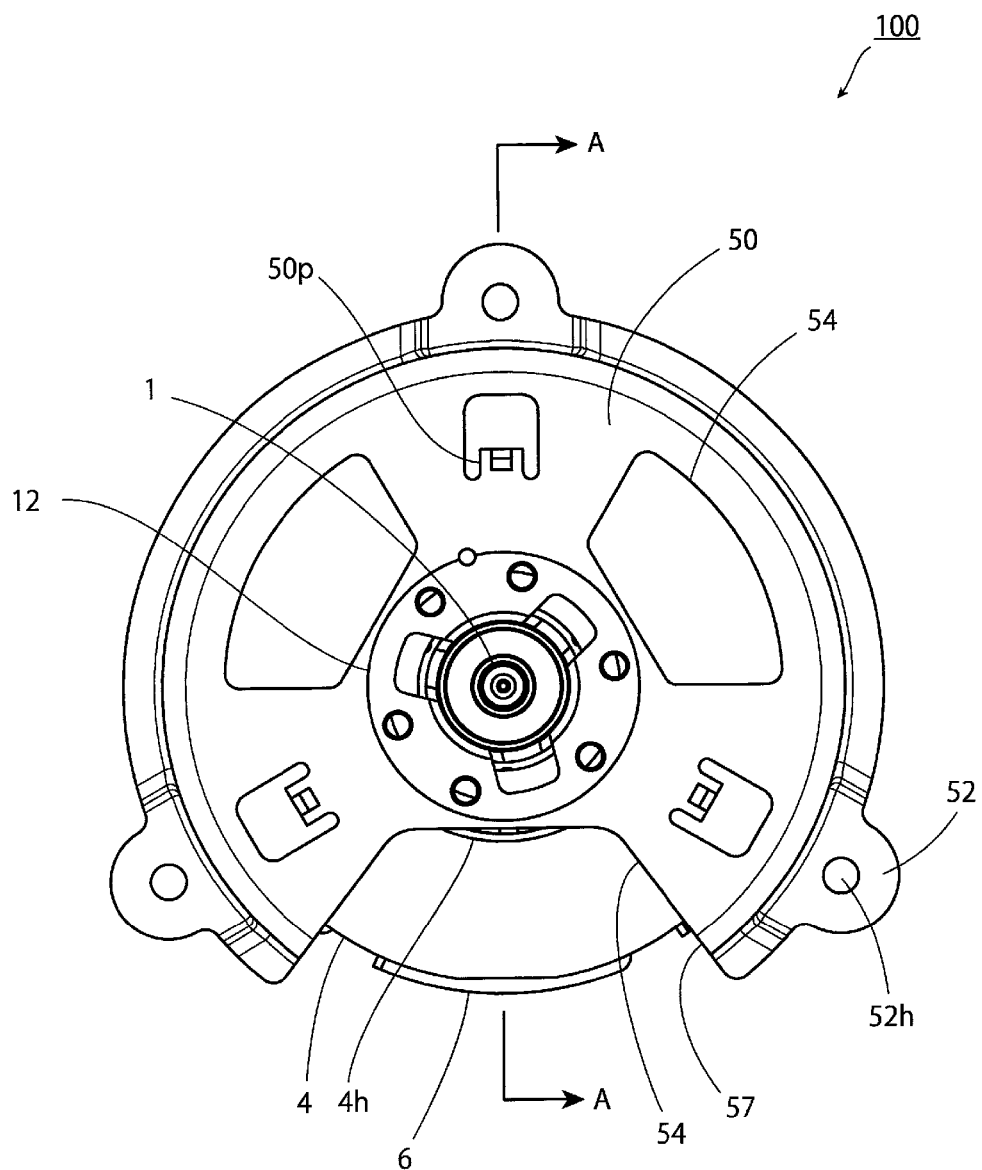
FIG. 6 is a plan view of the motor 100 illustrated in FIG. 2.
Figure 7:
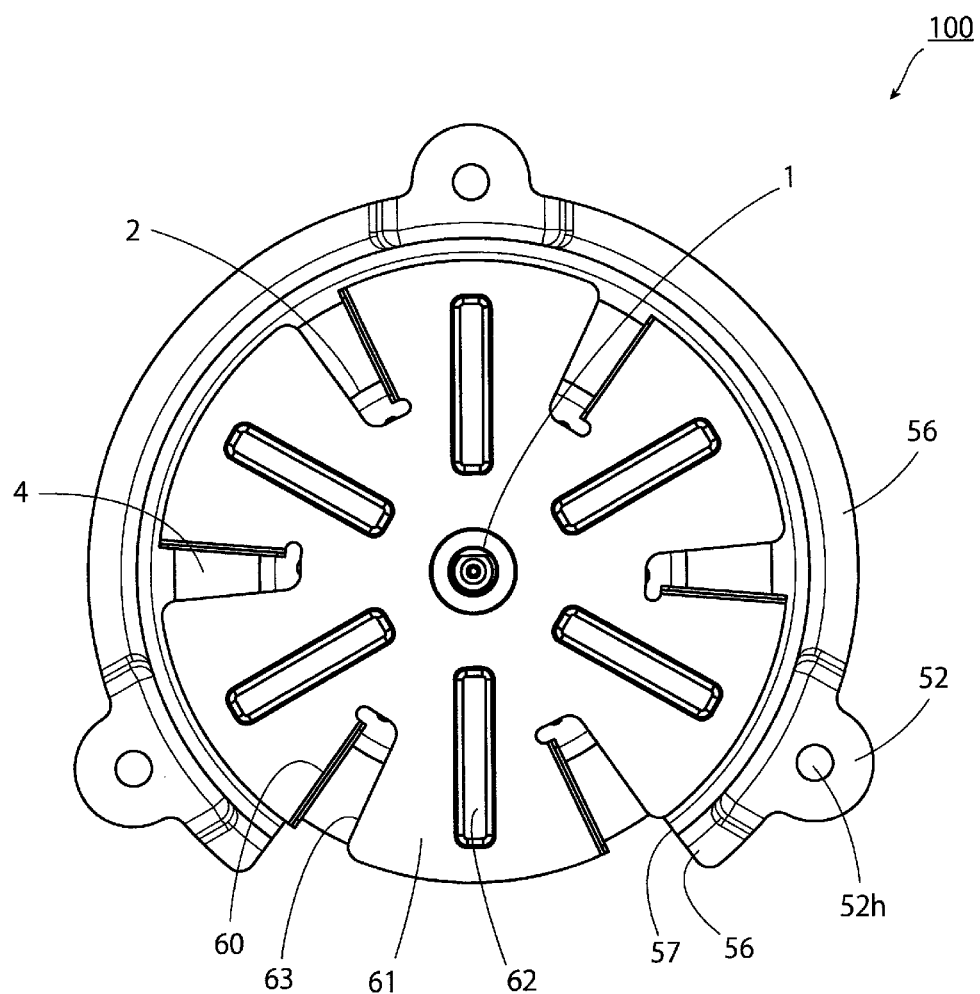
FIG. 7 is a bottom view of the motor 100 illustrated in FIG. 2.
Figure 8:
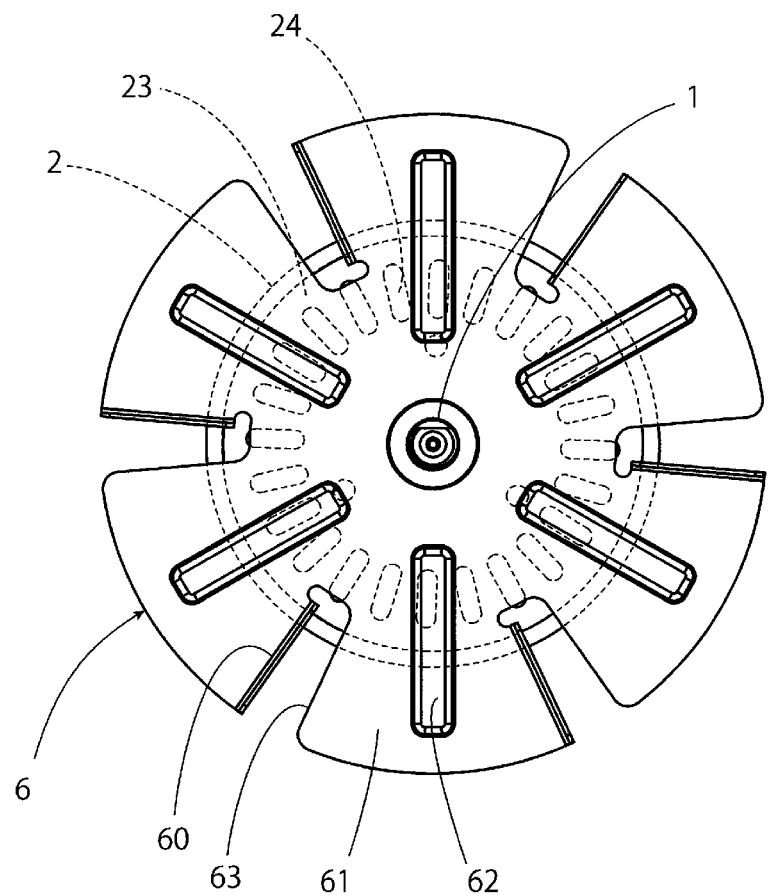
FIG. 8 is a diagram illustrating relative positions of an impeller 6 and a rotor 2 according to the first preferred embodiment of the present invention.

FIGS. 4, 5, 6, 7, and 8 are external views illustrating an exemplary structure of the motor 100 according to the present preferred embodiment. FIG. 4 is a front view of the motor 100, illustrating the secondary air outlet 57 as viewed from radially outside. FIG. 5 is a left side view of the motor 100, illustrating the motor 100 as viewed from the left-hand side in FIG. 4. FIG. 6 is a plan view of the motor 100, illustrating the motor 100 as viewed from above in the axial direction. FIG. 7 is a bottom view of the motor 100, illustrating the motor 100 as viewed from below in the axial direction. FIG. 8 illustrates relative positions of the impeller 6 and the rotor 2 when viewed from below in the axial direction. Note that the cross-sectional view of FIG. 2 is taken along line A-A illustrated in FIGS. 4 and 6.

Referring to FIG. 6, the air inlets 54 will now be described below. Each air inlet 54 is preferably an opening defined in the base portion 50 of the housing 5. For example, two or more openings each of which is trapezoidal or substantially trapezoidal are defined as the air inlets 54. Moreover, holes defined as a result of the lancing process of the supporting projections 50p may also be used as the air inlets 54. Provision of these air inlets 54 enables air to pass through the base portion 50 in the axial direction, permitting the outside air axially above the housing 5 to be taken into the housing 5.

In particular, since the gap is defined between the base portion 50 and the circuit board 4, easy passage of air between each air inlet 54 and the board vent hole 4h is ensured. Moreover, when any of the air inlets 54 is arranged opposite to the board vent hole 4h, easier passage of air between the air inlet 54 and the board vent hole 4h is ensured. For example, when the air inlets 54 are defined in the base portion 50 such that at least a portion of any air inlet 54 axially overlaps with the board vent hole 4h, easy passage of air between the air inlet 54 and the board vent hole 4h is ensured. Note that, even in the case where no gap is defined between the base portion 50 and the circuit board 4, easy axial passage of air is ensured when any air inlet 54 is arranged opposite to the board vent hole 4h.

Referring to FIGS. 4 and 5, the main air outlets 55 will now be described below. Each main air outlet 55 is preferably an opening defined below the cover portion 51 of the housing 5. Each main air outlet 55 is a gap defined between the high temperature chamber wall surface 505 and an outlet edge portion 56 when the motor 100 has been attached to the high temperature chamber wall surface 505. The outlet edge portion 56 is a lower edge portion of the cover portion 51, and is defined at a position circumferentially between adjacent ones of the attachment portions 52. That is, each main air outlet 55 is a gap defined between the high temperature chamber wall surface 505 and the cover portion 51 of the housing 5, is arranged between circumferentially adjacent ones of the attachment portion 52, and is configured to connect a space radially inside the housing 5 and a space radially outside the housing 5 with each other. Provision of the main air outlets 55 as described above enables air inside the housing 5 to be discharged to an outside through each main air outlet 55 through the air current traveling radially outward and caused by the blades 60, to cool an interior of the housing 5.

Each outlet edge portion 56 is preferably defined, for example, as a cut portion at the lower end of the cover portion 51. In this case, since each outlet edge portion 56 is arranged at an axial level higher than an axial level of the lower end of each attachment portion 52, the gap is preferably defined between the outlet edge portion 56 and the high temperature chamber wall surface 505 when the attachment portions 52 are arranged to be in contact with the high temperature chamber wall surface 505, and this gap defines and serves as the main air outlet 55.

Each main air outlet 55 preferably has an elongated shape extending in the circumferential direction, to achieve efficient discharge of the air through the main air outlet 55. In particular, each main air outlet 55 preferably has a greater circumferential dimension, specifically, a greater circumferential dimension than the circumferential dimension of each attachment portion 52. In addition, two or more of such outlet edge portions 56 are preferably located in a circumferential direction of the cover portion 51 to increase the total area of the main air outlets 55. Further, an outer edge of each blade 60 is preferably opposed to each outlet edge portion 56. For example, when each outlet edge portion 56 is located at an axial level higher than an axial level of a lower end of each blade 60, at least a portion of the outer edge of each blade 60 will be opposed to each main air outlet 55 to facilitate the discharge of the air.

Furthermore, each outlet edge portion 56 preferably includes a collar portion projecting radially outward, in order to more efficiently cool the motor 100. Provision of the collar portion causes a discharged high-temperature air to travel farther away from the motor 100 to reduce the likelihood that the discharged high-temperature air will return into the motor 100 through any of the air inlets 54 and the secondary air outlet 57 of the housing 5 or the like.

Referring to FIGS. 4 and 6, the secondary air outlet 57 of the housing 5 will now be described below. The secondary air outlet 57 is preferably an opening defined as a result of cutting off a circumferential portion of the housing 5. The secondary air outlet 57, which has a specified circumferential dimension and extend in the axial direction, is defined in the cover portion 51 of the housing 5. Provision of the secondary air outlet 57 as described above enables air in a space radially outside the rotor 2 and inside the housing 5 to be discharged to the outside through rotation of the rotor 2 to cool the interior of the housing 5.

A lower end of the secondary air outlet 57 reaches one of the outlet edge portions 56 of the cover portion 51, and the secondary air outlet 57 is joined to one of the main air outlets 55. That is, the secondary air outlet 57 is arranged circumferentially between adjacent ones of the attachment portions 52. In addition, an upper end of the secondary air outlet 57 reaches the upper end of the cover portion 51, then intrudes into the base portion 50, and is joined to one of the air inlets 54.

In order to efficiently discharge air through the secondary air outlet 57, the secondary air outlet 57 preferably has a circumferential extent of less than 180 degrees. That is, the upper end of the cover portion 51 is preferably joined to the base portion 50 over an angular range of 180 or more degrees. Moreover, it is preferable that only one secondary air outlet 57, provided at one circumferential position, should be defined.

Referring to FIG. 7, the blades 60 of the impeller 6 will now be described below. Each blade 60 is configured to generate the air current traveling radially outward through the centrifugal force. Therefore, the more radially outward an outer circumferential end of the blade 60 is, the more efficiently the blade 60 is able to generate the air current. Therefore, the outer circumferential end of the blade 60 is preferably located more radially outward. For example, the outer circumferential end of the blade 60 is preferably located radially outward of the outer circumferential surface of the cylindrical portion 22 of the rotor holder 20. In FIG. 7, the outer edge of each blade preferably coincides with an outer circumferential edge of the rotating plate 61.

Moreover, a negative pressure is produced radially inside the outer circumferential end of each blade 60. Accordingly, the outer circumferential end of each blade 60 needs to be located at least radially outward of each rotor vent hole 24 to allow the negative pressure to cause an axial passage of air within the rotor 2.

Referring to FIGS. 7 and 8, the openings 63 of the impeller 6 will now be described below. Each opening 63 is an opening used for ventilation and defined in the rotating plate 61 of the impeller 6. The openings 63, which preferably number two or more, for example, are arranged at regular or substantially regular intervals in the circumferential direction. Provision of the openings 63 as described above enables axial passage of the air through the rotating plate 61.

Each of the openings 63 preferably has an elongated shape extending in a radial direction, and one end of the opening 63 is located radially inward of a corresponding one of the blades 60. For example, in the case where each blade 60 is defined by the lancing process, a cut hole defined as a result of defining the blade 60 is arranged circumferentially adjacent to the blade 60. In this case, the opening 63 is preferably defined by expanding this cut hole farther radially inward. Provision of such openings 63 contributes to effectively generating an air current passing axially downward through the rotating plate 61 when the negative pressure has been produced as a result of the rotation of the blades 60.

When the openings 63 are defined such that the openings 63 overlap with the rotor vent holes 24 when viewed in the axial direction, easy passage of air between the rotor vent holes 24 and the openings 63 is ensured. Meanwhile, when the openings 63 are defined such that the openings 63 do not overlap with the rotor vent holes 24 when viewed in the axial direction, the radiant heat from the high temperature chamber wall surface 505 is effectively blocked. Therefore, when the easy passage of air should take precedence over the blocking of the radiant heat, the openings 63 are defined such that the openings 63 overlap with the rotor vent holes 24 when viewed in the axial direction, whereas when the blocking of the radiant heat should take precedence over the easy passage of air, the openings 63 are defined such that the openings 63 do not overlap with the rotor vent holes 24 when viewed in the axial direction.

In FIGS. 7 and 8, the openings 63 and the rotor vent holes 24 are configured to adjoin or substantially adjoin each other while overlapping with each other when viewed in the axial direction, so that the easy passage of air and the blocking of the radiant heat are balanced. More specifically, the openings 63 are located more radially outward than the rotor vent holes 24, and the openings 63 and the rotor vent holes 24 are located to radially adjoin or substantially adjoin each other. While the openings 63 and the rotor vent holes 24 slightly overlap with each other, a half or more of the area of each rotor vent hole is covered with the rotating plate 61, and therefore, a sufficient blocking effect is obtained.

Figure 9:
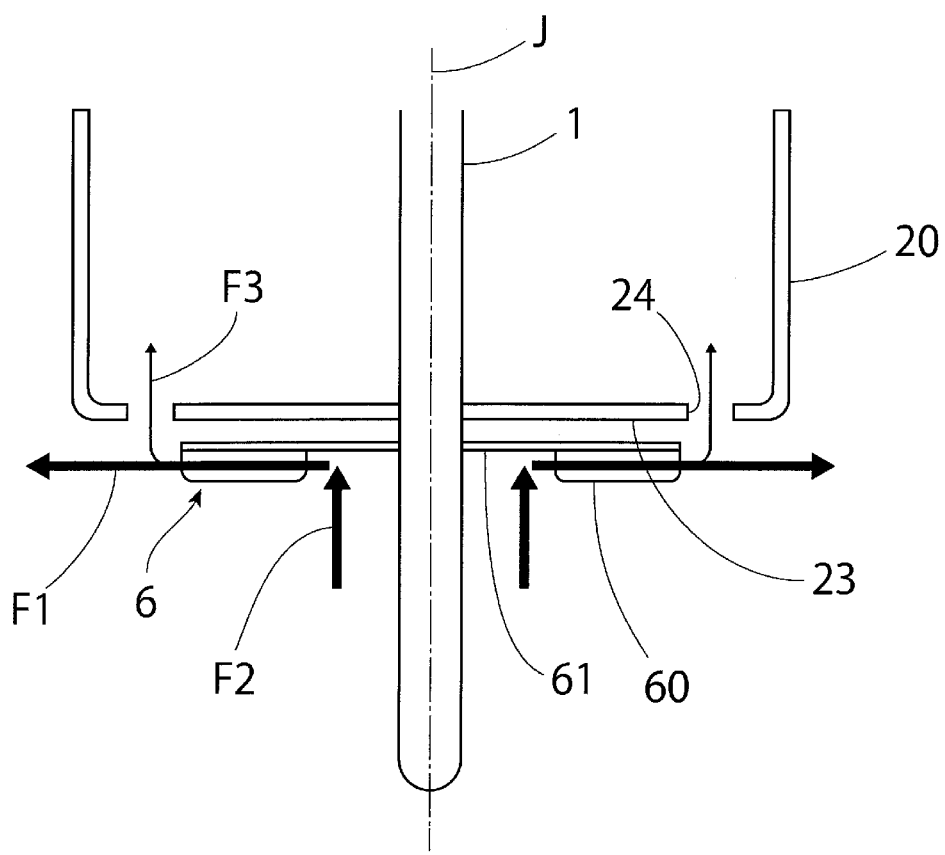
FIG. 9 is a diagram explaining air currents generated by rotation of a first comparative example of the impeller 6.
Figure 10:
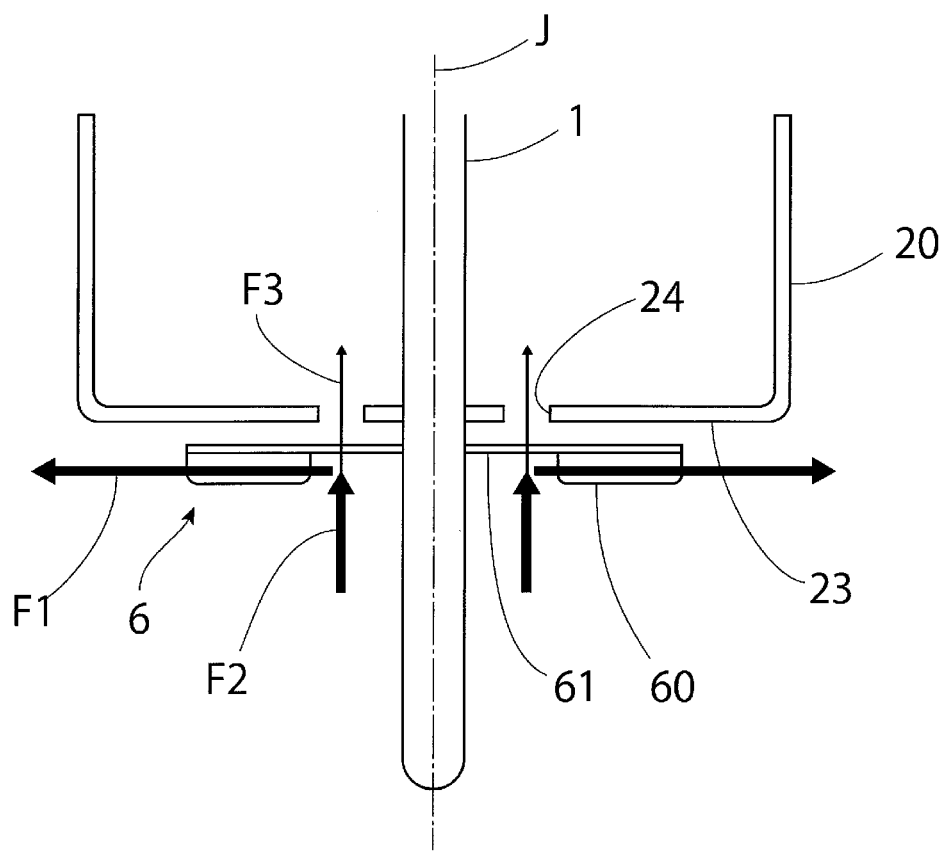
FIG. 10 is a diagram explaining the air currents generated by the rotation of a second comparative example of the impeller 6.
Figure 11:
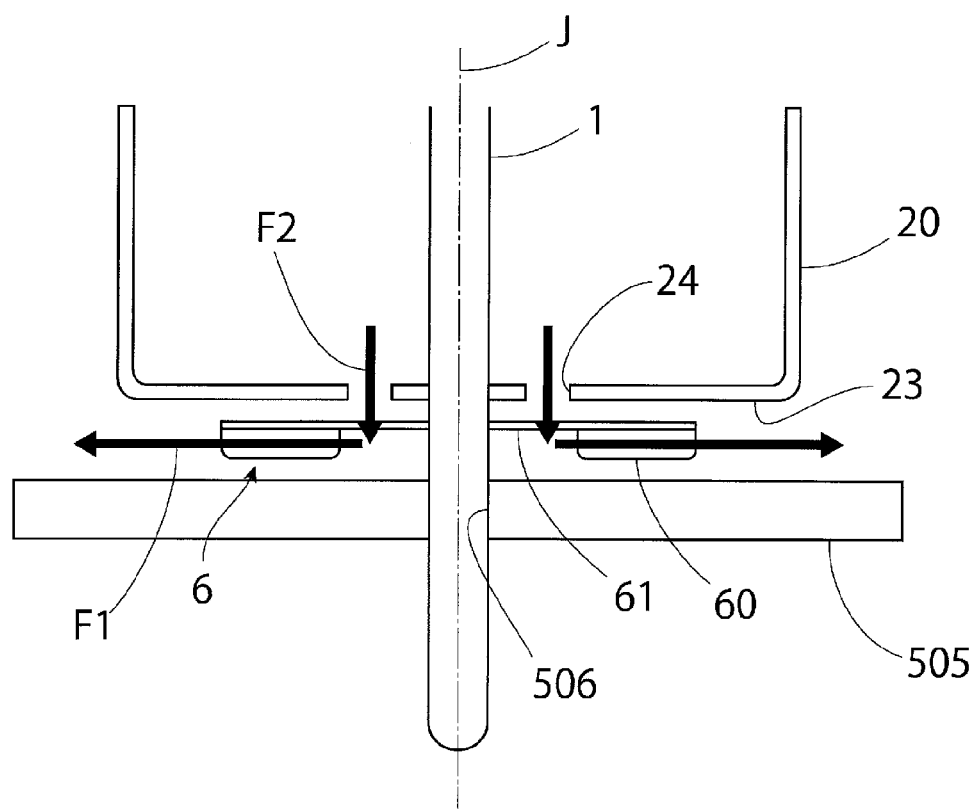
FIG. 11 is a diagram explaining the air currents generated by the rotation of a first example structure of the impeller 6 according to the first preferred embodiment of the present invention.
Figure 12:
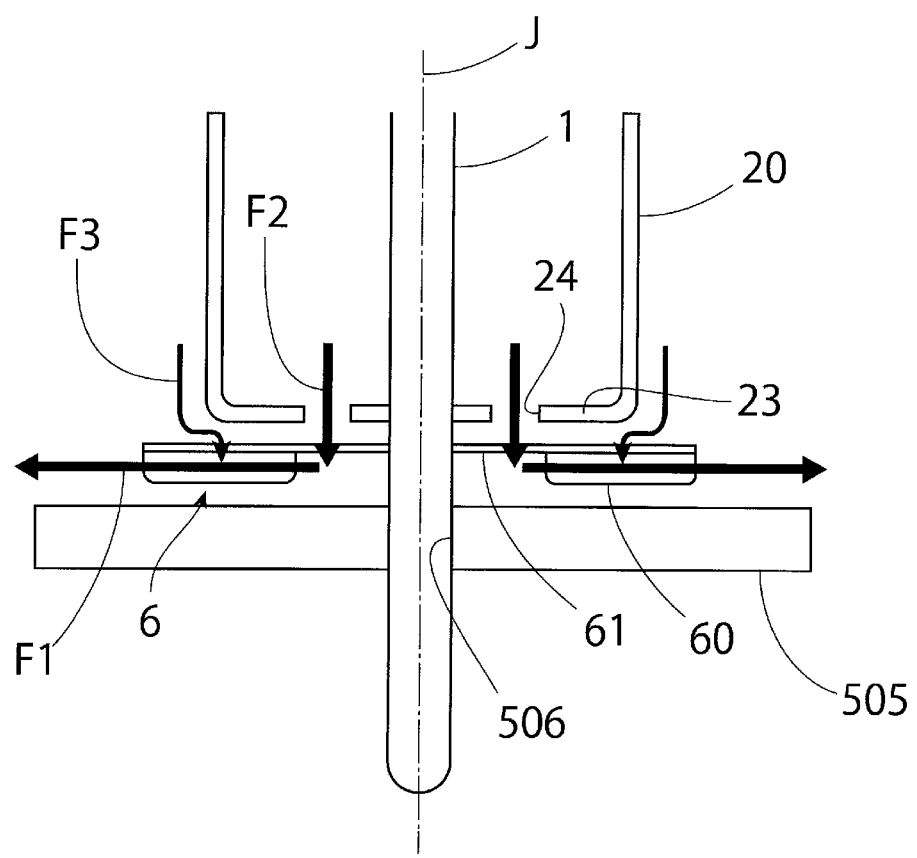
FIG. 12 is a diagram explaining the air currents generated by the rotation of a second example structure of the impeller 6 according to the first preferred embodiment of the present invention.

FIGS. 9, 10, 11, 12, and 13 are diagrams explaining a cooling principle of the motor 100 according to the present preferred embodiment. FIGS. 9 to 12 are diagrams explaining air currents F1, F2, and F3 generated by rotation of the impeller 6, and each illustrates a structure defined by the shaft 1, the rotor holder 20, and the impeller 6 in a simplified form. Structures according to comparative examples are illustrated in FIGS. 9 and 10, whereas example structures according to the present preferred embodiment are illustrated in FIGS. 11 and 12.

Each of the rotor holder 20 and the impeller 6 is fixed to the shaft 1, and is configured to rotate about the rotation axis J. The rotor holder 20 preferably includes the rotor vent holes 24 defined in the bottom plate portion 23 thereof. The impeller 6 is located below the bottom plate portion 23. The impeller 6 preferably includes the rotating plate 61 and the two or more blades 60 arranged thereon, and each blade 60 extends in a radial direction and in parallel with the rotation axis J. In addition, the openings 63 (not shown) are defined in the rotating plate 61.

FIG. 9 illustrates, as a first comparative example, a structure in which the rotor vent holes 24 are located radially outward of the blades 60, and in which there is an open space axially below the impeller 6. Once the impeller 6 starts rotating, air between every adjacent ones of the blades 60 also rotates, and the air current F1, which travels radially outward, is generated by a resulting centrifugal force. As a result, an atmospheric pressure is reduced radially inside the blades 60, and a negative pressure is produced in the vicinity of a center of the impeller 6.

The negative pressure would cause air axially above or below the impeller 6 to be drawn toward the vicinity of the center of the impeller 6. However, the bottom plate portion 23 of the rotor holder 20 blocks a space above the impeller 6. Therefore, air flows into the vicinity of the center of the impeller 6 from the open space axially below the impeller 6. That is, the air current F2, which flows axially upward in the vicinity of the shaft 1 toward the impeller 6, is generated. Since the rotor vent holes 24 are located radially outward of the blades 60, a portion of the air current F1, which travels radially outward, flows into the rotor holder 20 through each rotor vent hole 24.

FIG. 10 illustrates, as a second comparative example, a structure in which the rotor vent holes 24 are located radially inward of the blades 60, and in which there is an open space axially below the impeller 6. Once the impeller 6 starts rotating, the air current F1, which travels radially outward, is generated, and a negative pressure is produced in the vicinity of the center of the impeller 6, as in the case of FIG. 9.

In this case, air is drawn toward the vicinity of the center of the impeller 6 from both axially above and axially below. However, the air is more easily drawn from the open space axially below than from axially above through the rotor vent holes 24. Therefore, as in the case of FIG. 9, the air current F2, which flows axially upward in the vicinity of the shaft 1 toward the impeller 6, is generated. At this time, a portion of the air current F2 flows into the rotor holder 20 through each rotor vent hole 24.

FIG. 11 illustrates, as a first example structure according to the present preferred embodiment, a structure in which the rotor vent holes 24 are located radially inward of the blades 60, and in which a space axially below the blades 60 is closed with the high temperature chamber wall surface 505. Once the impeller 6 starts rotating, the air current F1, which travels radially outward, is generated, and a negative pressure is produced in the vicinity of the center of the impeller 6, as in the cases of FIGS. 9 and 10.

A portion of the shaft 1 is accommodated in the through hole 506 of the high temperature chamber wall surface 505, and no gap is defined between an outer circumferential surface of the shaft 1 and an inner circumferential surface of the through hole 506. That is, the space axially below the impeller 6 is closed with the high temperature chamber wall surface 505. Therefore, the negative pressure produced in the vicinity of the center of the impeller 6 generates the air current F2, which flows axially downward through each rotor vent hole 24.

That is, once the air inside the rotor holder 20 travels toward the high temperature chamber wall surface 505 and reaches the impeller 6, the air turns radially outward and is discharged out of the housing 5. Since the temperature of the high temperature chamber wall surface 505 becomes high, air having a high temperature exists in the vicinity of the high temperature chamber wall surface 505. However, generation of the air currents F1 and F2 as described above reduces the likelihood that the air in the vicinity of the high temperature chamber wall surface 505 will flow into the rotor holder 20. In addition, new outside air is taken into the rotor holder 20 from axially above. Further, the air having the high temperature and existing in the vicinity of the high temperature chamber wall surface 505 is discharged out of the housing 5 together with the air inside the rotor 2.

FIG. 12 illustrates, as a second example structure according to the present preferred embodiment, a structure in which the impeller 6 has an outside diameter greater than the outside diameter of the rotor holder 20. Because relative positions of the rotor vent holes 24, the blades 60, and the high temperature chamber wall surface 505 are the same as in the case of FIG. 11, the air currents F1 and F2 generated are the same as those generated in the case of FIG. 11.

Since the outside diameter of the rotating plate 61 is greater than the outside diameter of the rotor holder 20, a negative pressure produced by the impeller 6 generates the air current F3, which flows axially downward, radially outside the rotor holder 20. The negative pressure is produced radially inside the outer circumferential ends of the blades 60. Therefore, when the outer circumferential ends of the blades 60 are located radially outward of an outer circumferential surface of the rotor holder 20, the air current F3, which flows axially downward, is generated radially outside the rotor holder 20. In addition, when there is a gap between the rotating plate 61 of the impeller 6 and the bottom plate portion 23 of the rotor holder 20, the air current F3 flows radially inward in this gap and joins the air current F2.

However, the air amount of the air current F3 is smaller than that of the air current F2, and the velocity of the air current F3 is lower than that of the air current F2. The negative pressure is produced radially inside the outer circumferential ends of the blades 60, and increases with decreasing distance from a center of rotation of the blades 60. In addition, a channel through which the air current F3 travels radially inward in a gap between the rotor holder 20 and the rotating plate 61 is complicated, and air is unable to flow smoothly in this channel. Therefore, the air current F3, which flows outside the rotor holder 20, is generated as a weaker flow of air than the air current F2, which flows inside the rotor holder 20.

Figure 13:
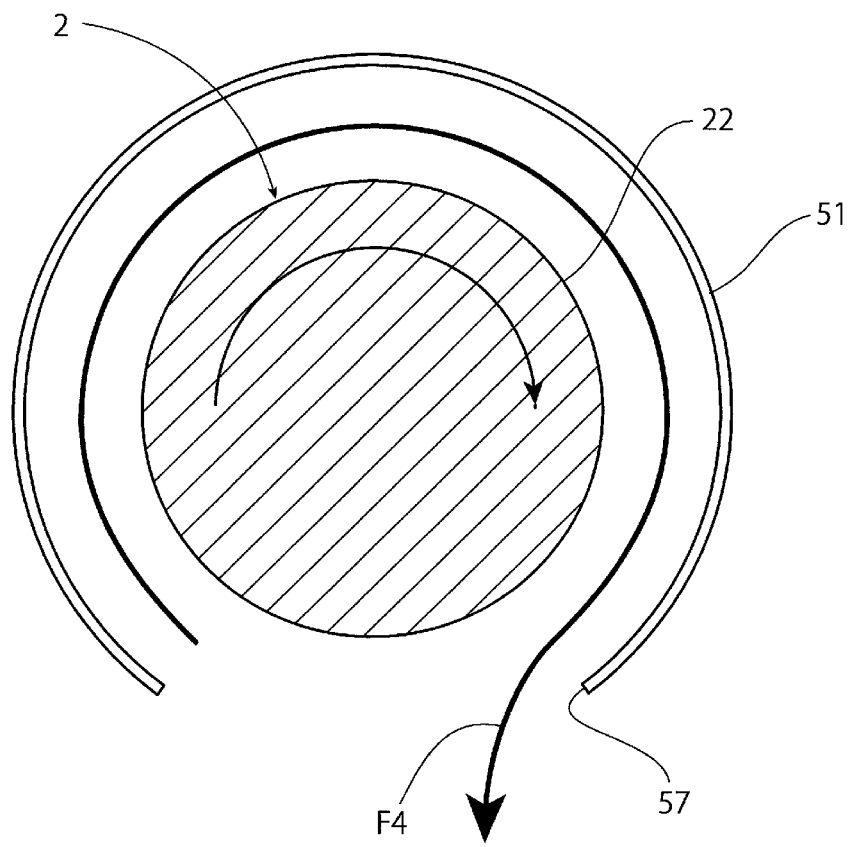
FIG. 13 is a diagram explaining an air current generated by rotation of the rotor 2.

FIG. 13 is a diagram explaining an air current F4 generated by the rotation of the rotor 2, and illustrates a cross section taken along line B-B in FIG. 4 in a simplified form. The rotor holder 20 is opposed to the housing 5 with a radial gap intervening therebetween, and a cylindrical space is defined radially outside the rotor 2. More specifically, the cylindrical space is located axially between the circuit board 4 and the impeller 6 and radially between the cylindrical portion 22 of the rotor holder 20 and the cover portion 51 of the housing 5.

Air in the cylindrical space rotates together with the rotor 2. Therefore, when the secondary air outlet 57 is defined in the cover portion 51 of the housing 5, a portion of the rotating air is discharged out of the housing 5 through the secondary air outlet 57 through a centrifugal force. Thus, the air radially outside the rotor holder 20 is cooled.

Figure 14:
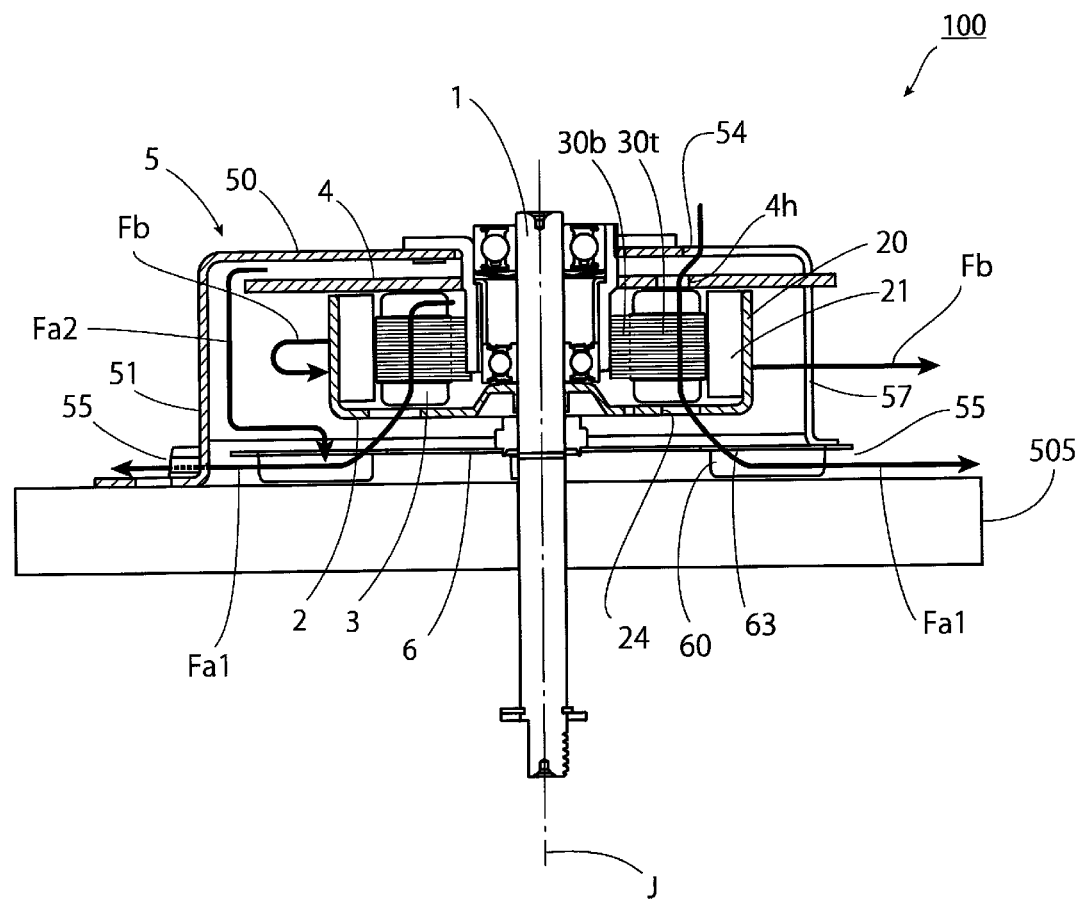
FIG. 14 is a diagram illustrating exemplary flows of air inside the motor 100.

FIG. 14 is a diagram illustrating exemplary flows of air inside the motor 100, and illustrates air currents Fa1 and Fa2 each of which flows in the axial direction inside the motor 100, and an air current Fb which flows in the circumferential direction inside the motor 100.

First, the air current Fa1, which flows in the axial direction, will now be described below. The air current Fa1 is a flow of outside air which is taken in from above the motor 100, then travels axially downward through an interior of the rotor 2, and is then discharged radially outward along the high temperature chamber wall surface 505. The air current Fa1 is caused by the rotation of the impeller 6.

The outside air is taken into the housing 5 through each air inlet 54 of the base portion 50. Since the base portion 50 is located on an opposite side with respect to the high temperature chamber wall surface 505, outside air which is away from the high temperature chamber wall surface 505 and which has a low temperature is taken into the motor 100 by introducing the outside air through each of the air inlets 54 defined in the base portion 50. The air taken into the housing 5 passes through the board vent hole 4h of the circuit board 4 to enter into the rotor holder 20 through the upper opening 25, and travels in the axial direction inside the rotor holder 20.

Inside the rotor holder 20, the air flows axially downward between the rotor magnet 21 and the core back 30b. The teeth 30t, which number two or more, are arranged between the rotor magnet 21 and the core back 30b, and the air current Fa1 passes between adjacent ones of the teeth 30t. Then, the air reaches the bottom plate portion 23 of the rotor holder 20, and then travels out of the rotor holder 20 through each rotor vent hole 24.

After traveling out of the rotor holder 20, the air passes axially downward through each opening 63 of the impeller 6, and then turns radially outward and is discharged out of the motor 100 through each main air outlet 55 of the housing 5. Because the air travels along the high temperature chamber wall surface 505 at this time, the air in the vicinity of the high temperature chamber wall surface 505 and having a high temperature is also discharged through each main air outlet 55.

An axial flow of air from each air inlet 54 of the base portion 50 to each opening 63 of the impeller 6 is generated when a channel inside the motor 100 and passing through the motor 100 in the axial direction is secured, and the impeller 6 has produced a negative pressure at an axially lower end of the channel. That is, inside the motor 100, a channel is secured for air entering through each air inlet 54, passing through the rotor holder 20 in the axial direction inside the rotor holder 20, and passing through each opening 63 of the impeller 6. In addition, the rotation of the blades 60 produces a negative pressure radially inside the outer circumferential end of each blade 60. Thus, the negative pressure causes an air current to flow axially downward through the above channel.

A flow of air traveling radially outward is generated by the rotation of the impeller 6. The air which has passed inside and through the motor 100 is discharged through each main air outlet 55 as the air is caused to flow radially outward along the high temperature chamber wall surface 505. Moreover, since the air in the vicinity of the high temperature chamber wall surface 505 and having a high temperature is also discharged radially outward, the likelihood that the temperature of each of the rotor 2, the circuit board 4, and so on will increase because of the air having a high temperature traveling axially upward is reduced.

Next, the air current Fa2, which flows in the axial direction, will now be described below. The air current Fa2 is a flow of outside air which is taken in from above the motor 100, then travels axially downward radially outside the rotor 2, and is then discharged radially outward along the high temperature chamber wall surface 505. The air current Fa2 is caused by the rotation of the impeller 6.

A gap is preferably defined between the upper surface of the circuit board 4 and the base portion 50. In addition, another gap is preferably defined between an outer circumferential end of the circuit board 4 and the cover portion 51. Accordingly, outside air which has been taken into the housing 5 through any air inlet 54 of the base portion 50 passes through these gaps to enter into a space between the rotor holder 20 and the cover portion 51, and travels in the axial direction outside the rotor holder 20. Then, after reaching the impeller 6, the air passes axially downward through each opening of the impeller 6, and then turns radially outward and is discharged out of the motor 100 through each main air outlet 55 of the housing 5. That is, the air joins the air current Fa1. In the above-described manner, the outside air, which has a low temperature, is taken into the motor 100 and is caused to pass in the axial direction radially outside the rotor 2, such that the interior of the motor 100 is cooled.

Next, the air current Fb, which flows in the circumferential direction, will now be described below. The air current Fb is a flow of air which travels in the circumferential direction radially outside the rotor 2, and which is discharged radially through a side surface of the housing 5. The air current Fb is caused by the rotation of the rotor 2. As is apparent from the above explanation of the air current Fa2, air supplied to the space radially outside the cylindrical portion 22 of the rotor holder 20 is the outside air taken in from above the motor 100.

Once the rotor 2 starts rotating, the air in a gap between the cylindrical portion 22 of the rotor holder 20 and the cover portion 51 of the housing 5 is caused to travel in the circumferential direction. That is, the air is caused to rotate about the rotation axis J. Then, a portion of the air which has reached the secondary air outlet 57 is discharged out of the housing 5 through the secondary air outlet 57 through the centrifugal force.

The structure and operation of the motor 100 according to the present preferred embodiment have been described above. Hereinafter, beneficial effects obtained by the structure or the operation described above will be described in detail.

The motor 100 according to the present preferred embodiment preferably is an outer-rotor motor attached to the high temperature chamber wall surface 505 when used. In the motor 100, the blades 60, which are configured to rotate together with the shaft 1 to generate the air current traveling radially outward, are located on a side of the rotor 2 closer to the high temperature chamber wall surface 505. In addition, the housing 5 includes the outlet edge portions 56, each of which defines a corresponding one of the main air outlets 55 together with the high temperature chamber wall surface 505. Further, the bottom plate portion 23 of the rotor holder 20, which is located on the side closer to the high temperature chamber wall surface 505, includes the rotor vent holes 24.

Adoption of the above arrangements makes it possible to effectively cool the interior of the motor 100. Once the shaft 1 starts rotating, air in a space between the rotor 2 and the high temperature chamber wall surface 505 is discharged through each main air outlet 55, and a space radially inside the outer circumferential ends of the blades 60 comes under negative pressure. Accordingly, the air inside the rotor holder 20 is caused to travel toward the space under negative pressure through each of the rotor vent holes 24 defined in the bottom plate portion 23 of the rotor holder 20. That is, the air inside the rotor holder 20 passes through each rotor vent hole 24 toward the high temperature chamber wall surface 505, and is discharged radially outward through each main air outlet 55 together with the air in the vicinity of the high temperature chamber wall surface 505 and having a high temperature. Thus, the air in the vicinity of the high temperature chamber wall surface 505 and having a high temperature is prevented from entering into the rotor holder 20, and an axially downward flow of air is generated inside the rotor holder 20 to cool the interior of the motor 100.

In the motor 100 according to the present preferred embodiment, the outer circumferential ends of the blades 60 are located radially outward of the rotor vent holes 24. Adoption of the above arrangement makes it possible to use the negative pressure produced radially inside the outer circumferential ends of the blades 60 to cause the air inside the rotor holder 20 to travel toward the high temperature chamber wall surface 505.

In the motor 100 according to the present preferred embodiment, the outer circumferential ends of the blades 60 are located radially outward of the outer circumferential surface of the cylindrical portion 22 of the rotor holder 20. Adoption of the above arrangement makes it possible to increase the velocity of the air current traveling radially outward to efficiently cool the interior of the motor 100. As the blades 60 are located more radially outward, the circumferential velocity of each rotating blade 60 increases. As the circumferential velocity of each rotating blade 60 increases, a centrifugal force acting on the air around the blades 60, the air rotating together with the blades 60, also increases, and the flow velocity of the air current traveling radially outward also increases. Therefore, when the outer circumferential ends of the blades 60 are located radially outward of the outer circumferential surface of the rotor holder 20, the interior of the motor 100 is efficiently cooled.

In the motor 100 according to the present preferred embodiment, each blade 60 is preferably defined by a flat plate located in parallel or substantially in parallel with the rotation axis J, and extends in a radial direction. Adoption of the above arrangement makes it possible to generate the air current traveling radially outward by employing the centrifugal force. In addition, the air current traveling radially outward is generated regardless of whether the shaft 1 is caused to rotate in a normal direction or in a reverse direction.

In the motor 100 according to the present preferred embodiment, the rotor vent holes 24 are located radially inward of the rotor magnet 21. Adoption of the above arrangement makes it possible to smooth a flow of air which travels in the axial direction inside the rotor holder 20 toward the rotor vent holes 24.

The rotor magnet 21 is fixed to the inner circumferential surface of the cylindrical portion 22 of the rotor holder 20. Accordingly, the flow of air which travels in the axial direction inside the rotor holder 20 is generated radially inside the inner circumferential surface of the rotor magnet 21. Therefore, when the rotor vent holes 24 are located radially inward of the rotor magnet 21, a channel for the air inside the rotor holder 20 becomes straight or substantially straight, enabling a smooth flow of the air.

In the motor 100 according to the present preferred embodiment, the stator 3 includes the annular core back 30*b* and the two or more teeth 30*t* extending radially outward from the core back 30*b*. The rotor vent holes 24 are located radially outward of the core back 30*b*. Adoption of the above arrangements makes it possible to smooth the flow of air which travels in the axial direction inside the rotor holder 20 toward the rotor vent holes 24.

The core back 30*b* is fixed to an outer circumferential surface of the bearing holding portion 11. Accordingly, the axial flow of air inside the rotor holder 20 is generated radially outside the outer circumferential surface of the core back 30*b*, that is, radially outside radially inner ends of the teeth 30*t*. Therefore, when the rotor vent holes 24 are located radially outward of the core back 30*b*, the channel for the air inside the rotor holder 20 becomes straight or substantially straight, enabling the smooth flow of the air.

In the motor 100 according to the present preferred embodiment, the two or more rotor vent holes 24 are located in the circumferential direction. Adoption of the above arrangement makes it possible to smooth a flow of air which passes in the axial direction through the bottom plate portion 23 of the rotor holder 20, enabling a smooth flow of air from the rotor holder 20 to the impeller 6.

The motor 100 according to the present preferred embodiment includes the impeller 6 including the rotating plate 61 and the blades 60. The rotating plate 61 is located axially below the rotor holder 20, is in or substantially in the shape of a flat plate and perpendicular or substantially perpendicular to the rotation axis J, and is configured to rotate together with the shaft 1. Each of the blades 60 axially projects from the rotating plate 61. Adoption of the above arrangements makes it possible to block the radiant heat from the high temperature chamber wall surface 505 with the rotating plate 61. This contributes to preventing the radiant heat from increasing the temperature of the rotor holder 20.

In the motor 100 according to the present preferred embodiment, the rotating plate 61 is spaced away from the bottom plate portion 23 of the rotor holder 20. Adoption of the above arrangement defines a gap between the rotating plate 61 and the rotor holder 20, and makes it difficult for heat in the rotating plate 61, which blocks the radiant heat, to be transferred to the rotor holder 20. In addition, a flow of air which passes through each rotor vent hole 24 is made smooth.

In the motor 100 according to the present preferred embodiment, the rotating plate 61 is preferably defined by a metal sheet subjected to, for example, a stamping process, and the blades 60 are defined by, for example, subjecting the rotating plate 61 to the lancing process. Adoption of the above arrangements makes it possible to easily produce the impeller 6 from the single metal sheet.

In the motor 100 according to the present preferred embodiment, the ribs 62 are defined between the adjacent blades 60 in the rotating plate 61. Adoption of the above arrangement improves the strength of the rotating plate 61. In addition, the ribs 62 contribute to generating the air current traveling radially outward.

In the motor 100 according to the present preferred embodiment, each blade 60 projects axially downward from the rotating plate 61. Adoption of the above arrangement makes it possible to generate the air current traveling radially outward on a side of the rotating plate 61 closer to the high temperature chamber wall surface 505. This contributes to preventing the high-temperature air in the vicinity of the high temperature chamber wall surface 505 from approaching the rotor holder 20.

In the motor 100 according to the present preferred embodiment, a portion of each opening 63 is located radially inward of an inner circumferential end of a corresponding one of the blades 60 in the rotating plate 61. Adoption of the above arrangement makes it possible to cause the air inside the rotor holder 20 to travel toward the high temperature chamber wall surface 505 by employing the negative pressure produced by the rotation of each blade 60. In particular, when an inner circumferential end of each opening 63 is located radially inward of the inner circumferential end of a corresponding one of the blades 60, a larger area of the opening 63 is secured radially inside the outer circumferential end of the blade 60. Accordingly, the flow of air which passes through the rotating plate 61 is increased, and the interior of the motor 100 is effectively cooled.

In the case where a portion of the rotating plate 61 is cut and erected in the circumferential direction to define each blade 60, for example, a cut hole is defined circumferentially adjacent to the blade 60. The cut hole is further expanded radially inward and is used as the opening 63. Thus, a large area for the opening 63 is secured.

In the motor 100 according to the present preferred embodiment, the lower end of each blade 60 is arranged at an axial level lower than an axial level of each outlet edge portion 56 of the housing 5. That is, at least a portion of the outer circumferential end of each blade 60 will be opposed to each main air outlet 55. This enables the air to smoothly travel radially outward along the high temperature chamber wall surface 505, and makes it possible to effectively cool the motor 100.

In the motor 100 according to the present preferred embodiment, an upper end of each blade 60 is located at an axial level lower than an axial level of each outlet edge portion 56 of the housing 5. That is, the entire outer circumferential end of each blade 60 will be opposed to each main air outlet 55. This enables the air to smoothly travel radially outward along the high temperature chamber wall surface 505, and makes it possible to effectively cool the motor 100.

In the motor 100 according to the present preferred embodiment, the axial distance between the lower end of each blade 60 and the lower end of each attachment portion 52 is shorter than the axial distance between the rotor holder 20 and the rotating plate 61. Adoption of the above arrangement shortens the distance between each blade 60 and the high temperature chamber wall surface 505, and makes it possible to effectively discharge the high-temperature air in the vicinity of the high temperature chamber wall surface 505 through the air current traveling radially outward.

In the motor 100 according to the present preferred embodiment, a half or more of the area of each rotor vent hole 24 is covered with the rotating plate 61 when viewed from below in the axial direction. That is, the area of a region where each opening 63 and a corresponding one of the rotor vent holes 24 overlap with each other when viewed from below in the axial direction is less than a half of the area of the rotor vent hole 24. Adoption of the above arrangement contributes to effectively blocking the radiant heat from the high temperature chamber wall surface 505. In particular, in the case where the radiant heat from the high temperature chamber wall surface 505 is to be blocked more effectively, each rotor vent hole 24 is preferably entirely covered with the rotating plate 61.

The motor 100 according to the present preferred embodiment is preferably attached to the high temperature chamber wall surface 505 when in use. In the motor 100, the blades 60, which are configured to rotate together with the shaft 1 to generate the air current traveling radially outward, are arranged on the side of the rotor 2 closer to the high temperature chamber wall surface 505. In addition, the housing 5 includes the base portion 50 located axially above the rotor 2, the two or more attachment portions 52 attached to the high temperature chamber wall surface 505, which is located axially below the impeller 6, and the cover portion 51 arranged to join the base portion 50 and the attachment portions 52 to each other. Further, the base portion 50 includes the air inlets 54.

Adoption of the above arrangements makes it possible to effectively cool the interior of the motor 100. Once the shaft 1 starts rotating, the air in the space between the rotor 2 and the high temperature chamber wall surface 505 is discharged through each main air outlet 55. Accordingly, the outside air is taken in through each of the air inlets 54 defined in the base portion 50 of the housing 5, and the outside air taken in travels in the axial direction inside the cover portion 51 of the housing 5 toward the high temperature chamber wall surface 505. Accordingly, the high-temperature air in the vicinity of the high temperature chamber wall surface 505 is discharged radially along the high temperature chamber wall surface 505, and the outside air, which has a low temperature, is taken in through the base portion 50 on a side opposite to the side where the high temperature chamber wall surface 505 exists, such that a flow of air which passes axially downward inside the rotor holder 20 is generated to cool the interior of the motor 100.

In the motor 100 according to the present preferred embodiment, the circuit board 4 is arranged between the base portion 50 and the rotor 2, and the board vent hole 4h is defined in the circuit board 4. Adoption of the above arrangements secures a channel for air passing through the circuit board 4. Accordingly, the outside air taken in through each air inlet 54 is able to travel in the axial direction inside the cover portion 51 of the housing 5 toward the high temperature chamber wall surface 505.

In the motor 100 according to the present preferred embodiment, a gap is defined between the circuit board 4 and the base portion 50. This arrangement enables the outside air taken in through each air inlet 54 of the base portion 50 to smoothly travel to the board vent hole 4h of the circuit board 4. This arrangement is particularly suitable in the case where no air inlet 54 and the board vent hole 4h have a sufficient overlapping area when viewed in the axial direction.

In the motor 100 according to the present preferred embodiment, the board vent hole 4h is preferably arranged to at least partially overlap with at least one of the air inlets 54 when viewed from above in the axial direction. Adoption of the above arrangement enables the outside air taken in through the air inlet 54 to smoothly travel into the board vent hole 4h.

In the motor 100 according to the present preferred embodiment, at least a portion of the board vent hole 4h is located radially inward of the cylindrical portion 22 of the rotor holder 20. Adoption of the above arrangement enables outside air which has been taken into the housing 5 through any air inlet 54 and which has passed through the board vent hole 4h to be introduced into the rotor holder 20. Thus, a flow of air which passes in the axial direction inside the rotor holder 20 is generated to effectively cool the interior of the motor 100.

In the motor 100 according to the present preferred embodiment, a gap between the circuit board 4 and the upper end of the cylindrical portion 22 of the rotor holder 20 has a width smaller than the radial width of the rotor magnet 21. Adoption of the above arrangement reduces the likelihood that air radially outside the rotor holder 20 will be introduced into the rotor holder 20 through the gap between the circuit board 4 and the upper end of the cylindrical portion 22 of the rotor holder 20.

The outside air is introduced into the rotor holder 20 through each air inlet 54 and the board vent hole 4h. Therefore, the motor 100 is effectively cooled by promoting the introduction of air from above in the axial direction while limiting introduction of air from radially outside the rotor holder 20. In particular, each air inlet 54 is able to introduce outside air which is away from the high temperature chamber wall surface 505 and which has a relatively low temperature, and the motor 100 is effectively cooled by taking such outside air into the rotor holder 20.

In the motor 100 according to the present preferred embodiment, the cover portion 51 of the housing 5 is located radially outside the rotor holder 20, and a gap is defined between the cover portion 51 and the rotor holder 20. Adoption of the above arrangement makes it possible to shield the rotor holder 20 from outside air radially outside the cover portion 51, and makes it hard for the high-temperature air which has been discharged through each main air outlet 55 to return to the rotor holder 20. Cooling performance thus is improved.

In the motor 100 according to the present preferred embodiment, the upper end of the cover portion 51 of the housing 5 is continuous with the base portion 50 over an angular range of 180 or more degrees. Adoption of the above arrangement makes it hard for the high-temperature air which has been discharged through each main air outlet 55 to return to the rotor holder 20. The cooling performance thus is improved.

In the motor 100 according to the present preferred embodiment, the cover portion 51 of the housing 5 preferably includes the secondary air outlet 57 defined at one circumferential position. Adoption of the above arrangement enables air between the cylindrical portion 22 of the rotor holder 20 and the cover portion 51 of the housing 5 to be discharged out of the housing 5 through the secondary air outlet 57.

The rotation of the rotor 2 causes the air radially outside the rotor holder 20 to rotate in the circumferential direction. Therefore, when the secondary air outlet 57 is defined in the cover portion 51 of the housing 5, the air radially outside the rotor holder 20 is discharged out of the housing 5 through the centrifugal force. For example, a high-temperature air which has not been discharged through any main air outlet 55 is discharged out of the housing 5 through the secondary air outlet 57. This leads to effective cooling of the interior of the motor 100.

In the motor 100 according to the present preferred embodiment, the secondary air outlet 57 of the housing 5 is joined to one of the main air outlets 55 of the housing 5. Adoption of the above arrangement contributes to increasing the axial dimension of the secondary air outlet 57 to more effectively discharge the air through the secondary air outlet 57.

In the motor 100 according to the present preferred embodiment, preferably only one secondary air outlet 57, arranged at one circumferential position, is defined in the housing 5. Adoption of the above arrangement contributes to effectively cooling the interior of the motor 100. In the case where only one secondary air outlet 57, located at one circumferential position, is defined in the housing 5, discharge of air is accomplished more easily than in the case where two or more secondary air outlets 57 are defined in the housing 5. In addition, the flow velocity of the air which is discharged is increased. This enables the air, which has a high temperature, to be discharged farther away to more effectively cool the motor 100.

In the motor 100 according to the present preferred embodiment, the secondary air outlet 57 of the housing 5 is located radially opposite the cylindrical portion 22 of the rotor holder 20. The discharge of the air through the secondary air outlet 57 is accomplished by using a centrifugal force generated as a result of air on an outer circumference of the rotor holder 20 rotating in the circumferential direction. Therefore, when the secondary air outlet 57 is located radially opposite the cylindrical portion 22 of the rotor holder 20, the discharge of the air through the secondary air outlet 57 is effectively accomplished.

In the motor 100 according to the present preferred embodiment, the impeller 6 has an outside diameter smaller than the inside diameter of the cover portion 51 of the housing 5. Adoption of the above arrangement contributes to miniaturization of the motor 100.

In the motor 100 according to the present preferred embodiment, each main air outlet 55 has a circumferential dimension greater than the circumferential dimension of each attachment portion 52 of the housing 5. Adoption of the above arrangement causes each main air outlet 55 to have a large circumferential dimension, and contributes to efficient discharge of the air. In addition, a reduction in the circumferential dimension of each attachment portion 52 leads to a reduction in an area of contact between the attachment portion 52 and the high temperature chamber wall surface 505, and to a reduction in heat which is transferred to the housing 5.

Second Preferred Embodiment

In the motor 100 according to the above-described preferred embodiment, the housing 5 preferably includes the secondary air outlet 57. In contrast, in a motor 101 according to a second preferred embodiment of the present invention, a housing 5 preferably includes no secondary air outlet 57. The motor 101 will now be described below.

Figure 15:
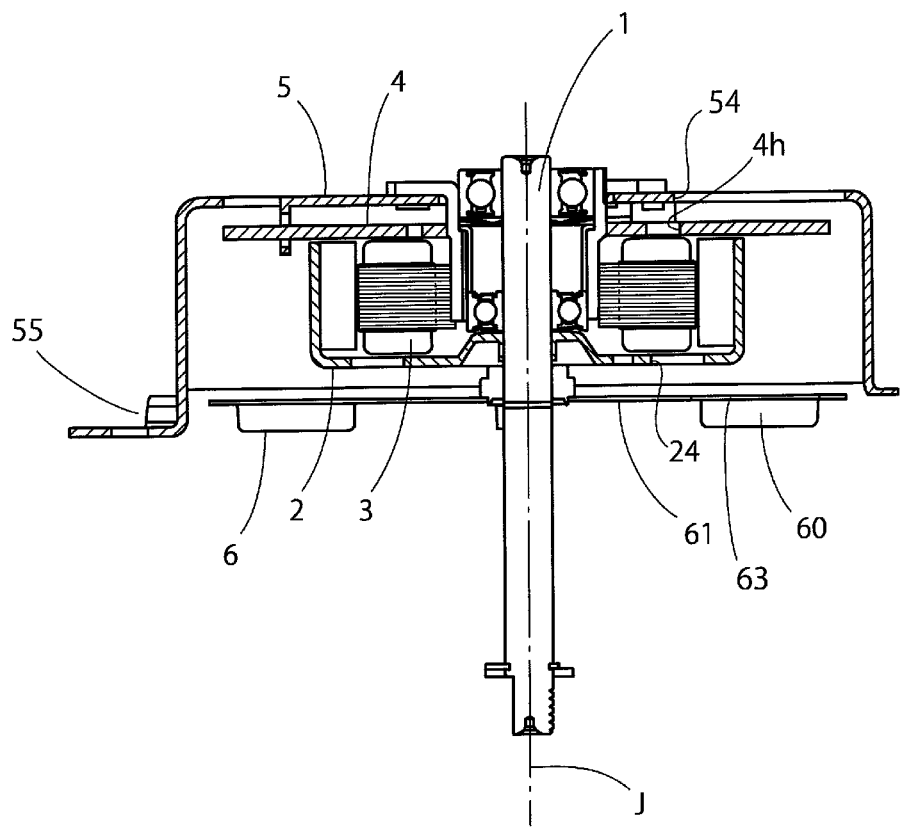
FIG. 15 is a diagram illustrating an exemplary structure of a motor 101 according to a second preferred embodiment of the present invention.

FIG. 15 is a diagram illustrating an exemplary structure of the motor 101 according to the second preferred embodiment of the present invention, and illustrates a section of the motor 101 taken along a plane including a rotation axis J. The motor 101 according to the present preferred embodiment is identical to the motor 100 according to the first preferred embodiment except that no secondary air outlet 57 is provided. Accordingly, like members or portions are designated by like reference numerals, and redundant description is omitted.

In the motor 101, a cover portion 51 of the housing 5 includes no secondary air outlet 57. Therefore, of the air currents Fa1, Fa2, and Fb illustrated in FIG. 14, the air current Fb, which flows in the circumferential direction, is not generated while the air currents Fa1 and Fa2, each of which flows in the axial direction, are still generated. More specifically, in a space radially between a rotor holder 20 and the housing 5, air is caused to rotate in the circumferential direction because of rotation of a rotor 2, but the air is not discharged through the secondary air outlet 57.

In the motor 101 according to the present preferred embodiment, no secondary air outlet 57 is provided, and a cylindrical portion 22 of the rotor holder 20 is opposed to the cover portion 51 of the housing 5 throughout the entire circumference. That is, the cylindrical portion 22 of the rotor holder 20 is covered with the cover portion 51 of the housing 5.

Third Preferred Embodiment

In each of the motors 100 and 101 according to the above-described preferred embodiments, each blade 60 preferably projects axially downward from the rotating plate 61. In contrast, a motor 102 according to a third preferred embodiment of the present invention, each of blades 60 preferably projects axially upward from a rotating plate 61. The motor 102 will now be described below.

Figure 16:
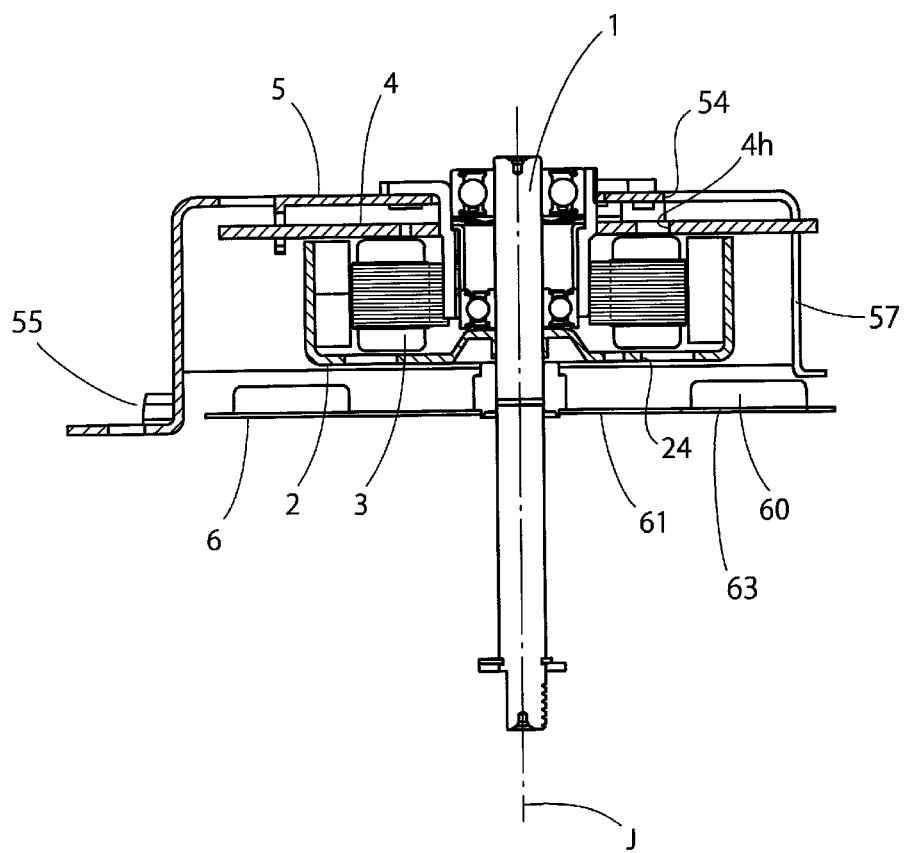
FIG. 16 is a diagram illustrating an exemplary structure of a motor 102 according to a third preferred embodiment of the present invention.

FIG. 16 is a diagram illustrating an exemplary structure of the motor 102 according to the third preferred embodiment of the present invention, and illustrates a section of the motor 102 taken along a plane including a rotation axis J. The motor 102 according to the present preferred embodiment is identical to the motor 100 according to the first preferred embodiment except in the shape of an impeller 6. Accordingly, like members or portions are designated by like reference numerals, and redundant description is omitted.

In the impeller 6 of the motor 102, each of the blades 60 projects axially upward from the rotating plate 61. Accordingly, once the impeller 6 starts rotating, an air current traveling radially outward is generated axially above the rotating plate 61. Therefore, air which travels axially downward through any rotor vent hole 24 turns radially outward without passing through any opening 63 of the rotating plate 61, and is discharged through main air outlets 55. Therefore, according to the present preferred embodiment, an axial passage of air is smoother than in the case of the motor 100, according to which air passes through each opening 63 of the impeller 6 and is then discharged.

Fourth Preferred Embodiment

In each of the motors 100 to 102 according to the above-described preferred embodiments, the rotor holder 20 and the impeller 6 are located axially opposite each with a gap intervening therebetween. In contrast, in a motor 103 according to a fourth preferred embodiment of the present invention, an impeller 6 is in contact with a bottom plate portion 23 of a rotor holder 20. The motor 103 will now be described below.

Figure 17:
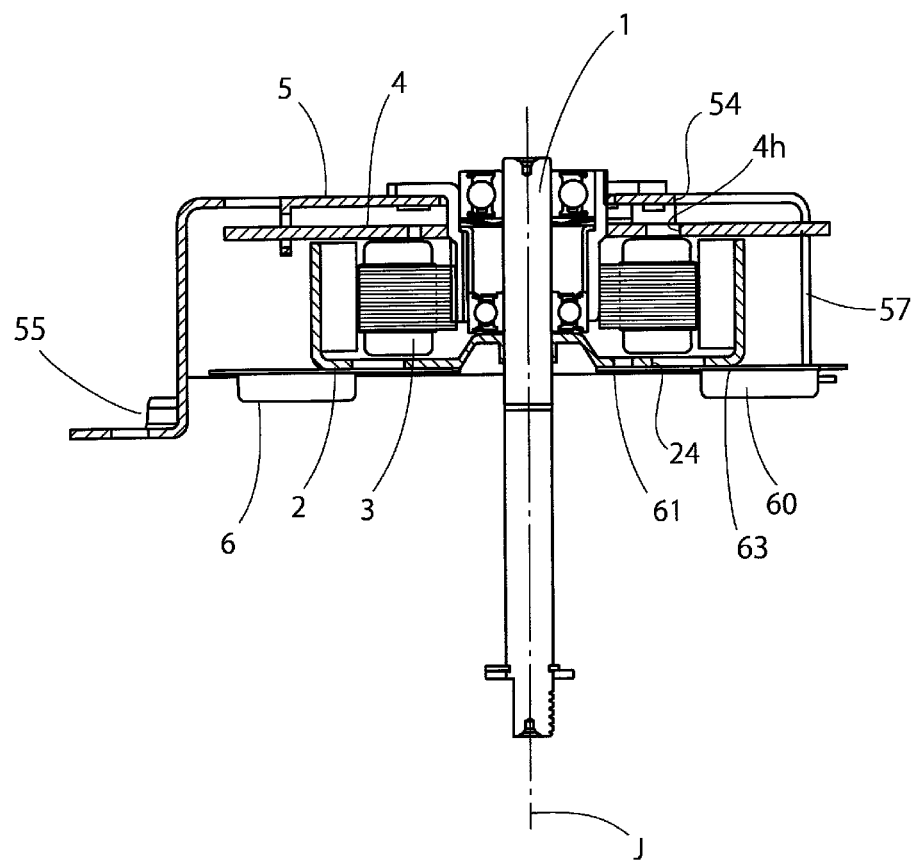
FIG. 17 is a diagram illustrating an exemplary structure of a motor 103 according to a fourth preferred embodiment of the present invention.

FIG. 17 is a diagram illustrating an exemplary structure of the motor 103 according to the fourth preferred embodiment of the present invention, and illustrates a section of the motor 103 taken along a plane including a rotation axis J. The motor 103 according to the present preferred embodiment is identical to the motor 100 according to the first preferred embodiment except in the axial position of the impeller 6. Accordingly, like members or portions are designated by like reference numerals, and redundant description is omitted.

The impeller 6 of the motor 103 is preferably fixed to a shaft 1 while being in contact with the rotor holder 20. That is, no gap is defined between a rotating plate 61 of the impeller 6 and the bottom plate portion 23 of the rotor holder 20. Accordingly, the motor 103 is able to have an axial dimension smaller than that of the motor 100, and to achieve a reduction in size. Note that, since no gap is defined between the impeller 6 and the rotor holder 20, each of openings 63 of the impeller 6 overlaps with at least one of rotor vent holes 24. Adoption of the above arrangements makes it possible to effectively cool an interior of the motor 103, and to reduce the axial dimension of the motor 103 to reduce the size of the motor 103.

Fifth Preferred Embodiment

In each of the motors 100 to 103 according to the above-described preferred embodiments, the impeller 6 preferably includes only one rotating plate 61. In contrast, in a motor 104 according to a fifth preferred embodiment of the present invention, an impeller 6 preferably includes two rotating plates 61a and 61b. The motor 104 will now be described below.

Figure 18:
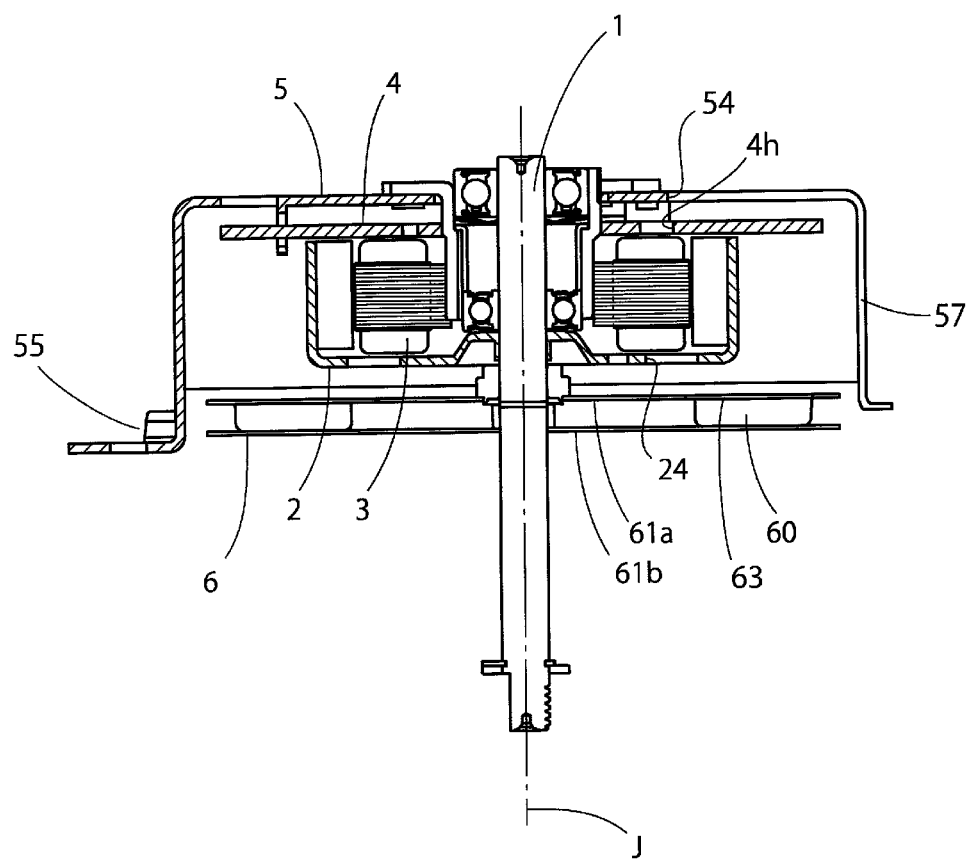
FIG. 18 is a diagram illustrating an exemplary structure of a motor 104 according to a fifth preferred embodiment of the present invention.

FIG. 18 is a diagram illustrating an exemplary structure of the motor 104 according to the fifth preferred embodiment of the present invention, and illustrates a section of the motor 104 taken along a plane including a rotation axis J. The motor 104 according to the present preferred embodiment is identical to the motor 100 according to the first preferred embodiment except in the shape of the impeller 6. Accordingly, like members or portions are designated by like reference numerals, and redundant description is omitted.

The impeller 6 of the motor 104 preferably includes an upper rotating plate 61a arranged on a side closer to a rotor 2, a lower rotating plate 61b located on a side closer to the high temperature chamber wall surface 505, and two or more blades 60 located between the upper rotating plate 61a and the lower rotating plate 61b.

The upper rotating plate 61a and the blades 60 correspond to the impeller 6 of the motor 100 according to the first preferred embodiment. For example, each blade 60 is preferably defined by, for example, subjecting the upper rotating plate 61a to the lancing process, and an opening 63 is defined as a result.

Meanwhile, the lower rotating plate 61b is used as a blocking plate. More specifically, the radiant heat from the high temperature chamber wall surface 505 is blocked by both the upper rotating plate 61a and the lower rotating plate 61b. In the case where the lower rotating plate 61b also includes openings 63, the radiant heat is effectively blocked by arranging each opening 63 of the lower rotating plate 61b not to overlap with any opening 63 of the upper rotating plate 61a when viewed in the axial direction. Moreover, in the case where no openings 63 are defined in the lower rotating plate 61b, the radiant heat is more effectively blocked.

In the motor 104 according to the present preferred embodiment, the two or more blades 60 are located between the upper rotating plate 61a and the lower rotating plate 61b to define the impeller 6. Adoption of the above arrangement makes it possible to more effectively block the radiant heat from the high temperature chamber wall surface 505.

Sixth Preferred Embodiment

In each of the motors 100 to 104 according to the above-described preferred embodiments, the blades 60 are preferably disposed on the rotating plate 61. In contrast, in a motor 105 according to a sixth preferred embodiment of the present invention, blades 60 are preferably disposed on a rotor holder 20. The motor 105 will now be described below.

Figure 19:
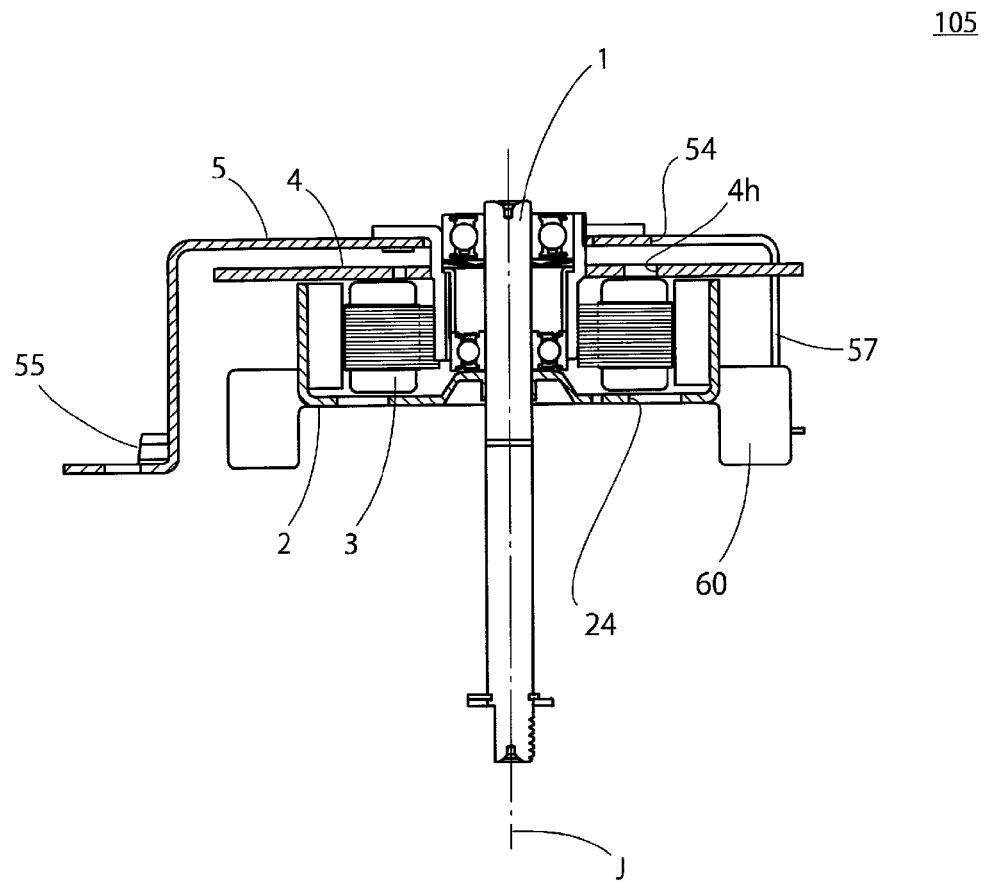
FIG. 19 is a diagram illustrating an exemplary structure of a motor 105 according to a sixth preferred embodiment of the present invention.

FIG. 19 is a diagram illustrating an exemplary structure of the motor 105 according to the sixth preferred embodiment of the present invention, and illustrates a section of the motor 105 taken along a plane including a rotation axis J. The motor 105 according to the present preferred embodiment is identical to the motor 100 according to the first preferred embodiment except that no impeller 6 is provided and the blades 60 are arranged on the rotor holder 20. Accordingly, like members or portions are designated by like reference numerals, and redundant description is omitted.

The motor 105 preferably does not include a rotating plate 61, and the blades 60 are instead attached to an outer circumferential surface of a cylindrical portion 22 of the rotor holder 20. Accordingly, rotation of a rotor 2 causes the blades 60 to rotate to generate an air current traveling radially outward.

At a lower end of each blade 60, a portion of an outer circumferential end of the blade 60 will be opposed to each of main air outlets 55. This enables the air current traveling radially outward to smoothly pass through each main air outlet 55 to an outside of a housing 5. In addition, since the lower end of each blade 60 is arranged at an axial level lower than an axial level of a bottom plate portion 23 of the rotor holder 20, the above air current is generated axially below the rotor holder 20, and a negative pressure is produced below the bottom plate portion 23 of the rotor holder 20. This makes it possible to generate an axial flow of air inside the rotor holder 20 through rotor vent holes 24.

In the motor 105 according to the present preferred embodiment, the blades 60 are provided on the outer circumferential surface of the cylindrical portion 22 of the rotor holder 20, and the lower end of each blade 60 is provided at an axial level lower than an axial level of a lower surface of the bottom plate portion 23 of the rotor holder 20. Adoption of the above arrangements makes it possible to effectively cool an interior of the motor 105, and to reduce the axial dimension of the motor 105 to reduce the size of the motor 105.

Note that, although it has been assumed that each of the motors 100 to 105 according to the above-described preferred embodiments is used as the driving source of the stirring fan 511 of the microwave oven 500, motors according to preferred embodiments of the present invention are not limited to such an application. In other words, various preferred embodiments of the present invention is applicable to any and all applications, including a variety of motors used under a high temperature environment, and, in particular, to motors attached to attachment surfaces having a high temperature. Also note that such an attachment surface may not necessarily be flat, that a motor according to a preferred embodiment of the present invention may be attached to the attachment surface in any manner, and that the attachment surface and the manner of attaching the motor to the attachment surface according to each of the above-described preferred embodiments have been described merely for the purpose of illustration and are not essential to the present invention.

Also note that, although the motor according to each of the above-described preferred embodiments preferably is an outer-rotor motor, preferred embodiments of the present invention are also applicable to an inner-rotor motor in which a stator is located radially outside and opposite a rotor with a gap intervening therebetween.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A self-cooled motor comprising:
   two or more attachment portions;
   a shaft extending supported by a bearing so as to be rotatable about a rotation axis extending in a vertical direction;
   a rotor configured to rotate together with the shaft;
   a stator located radially opposite to the rotor;
   a housing configured to support the bearing and the stator; and
   an impeller located axially below the rotor, and configured to rotate together with the shaft to generate an air current traveling radially outward; wherein
   the housing includes:
      a base portion located axially above the rotor;
      the two or more attachment portions, each of the two or more attachment portions being located radially outward of the rotor; and
      a cylindrical or substantially cylindrical cover portion configured to join the base portion and the two or more attachment portions to each other;
   a lower end of each of the two or more attachment portions is located at an axial level lower than an axial level of the impeller;
   the base portion includes an air inlet;
   the cover portion includes an air outlet located between adjacent ones of the two or more attachment portions, and configured to connect a space radially inside the housing and a space radially outside the housing with each other;
   the two or more attachment portions are configured to attach the self-cooled motor to a wall surface of a high temperature chamber such that the shaft will extend into the high temperature chamber;
   the rotor includes a rotor magnet and a rotor holder, the rotor holder including a cylindrical portion and a bottom plate portion;
   the bottom plate portion is directly opposed to and facing the wall surface of the high temperature chamber; and
   the impeller generates an airflow which travels radially outward along the wall surface.

2. The self-cooled motor according to claim 1, further comprising a circuit board located between the base portion and the rotor, wherein the circuit board includes an opening defined therein.

3. The self-cooled motor according to claim 2, wherein a gap is defined between the circuit board and the base portion.

4. The self-cooled motor according to claim 3, wherein the opening of the circuit board at least partially overlaps with the air inlet when viewed from above in an axial direction.

5. The self-cooled motor according to claim 4, wherein the rotor magnet is fixed to an inside of the cylindrical portion of the rotor holder; and
the bottom plate portion of the rotor holder includes a rotor vent hole defined therein.

6. The self-cooled motor according to claim 1, wherein the rotor magnet is fixed to an inside of the cylindrical portion of the rotor holder; and
the bottom plate portion of the rotor holder includes a rotor vent hole defined therein.

7. The self-cooled motor according to claim 6, further comprising a circuit board located between the base portion and the rotor; wherein
the circuit board includes an opening defined therein; and
at least a portion of the opening of the circuit board is located radially inward of the cylindrical portion of the rotor holder.

8. The self-cooled motor according to claim 7, wherein a gap is defined between the circuit board and an upper end of the cylindrical portion of the rotor holder; and
the gap has a width smaller than a radial width of the rotor magnet.

9. The self-cooled motor according to claim 6, wherein the cover portion of the housing is located radially outside the rotor holder with a gap defined between the cover portion and the rotor holder.

10. The self-cooled motor according to claim 6, wherein the impeller includes a blade; and
an outer circumferential end of the blade is located radially outward of an outer circumferential surface of the cylindrical portion of the rotor holder.

11. The self-cooled motor according to claim 1, wherein an upper end of the cover portion of the housing is continuous with the base portion over an angular range of about 180 or more degrees.

12. The self-cooled motor according to claim 11, wherein the cover portion of the housing includes at least one opening each of which is located at one circumferential position.

13. The self-cooled motor according to claim 12, wherein at least one of the at least one opening of the cover portion of the housing is defined as a cut portion at a lower end of the cover portion of the housing.

14. The self-cooled motor according to claim 13, wherein the at least one opening of the cover portion of the housing includes only one opening located at only one circumferential position.

15. The self-cooled motor according to claim 12, wherein the at least one opening of the cover portion of the housing includes only one opening located at only one circumferential position.

16. The self-cooled motor according to claim 12, wherein at least one of the at least one opening of the cover portion of the housing is located radially opposite to the cylindrical portion of the rotor holder.

17. The self-cooled motor according to claim 1, wherein the impeller has an outside diameter smaller than an inside diameter of the cover portion of the housing.

18. The self-cooled motor according to claim 1, wherein the impeller includes two or more blades; and
each blade is defined by a flat plate parallel or substantially in parallel with the rotation axis, and extends in a radial direction.

19. The self-cooled motor according to claim 1, wherein the air outlet has a circumferential dimension greater than a circumferential dimension of each attachment portion.

20. The self-cooled motor according to claim 1, wherein the housing is defined by a press-worked material.

* * * * *